(12) United States Patent (10) Patent No.: US 8,162,208 B2
Eckert et al. (45) Date of Patent: Apr. 24, 2012

(54) SYSTEMS AND METHODS FOR USER IDENTIFICATION STRING GENERATION FOR SELECTION OF A FUNCTION

(75) Inventors: Daniel J. Eckert, Chicago, IL (US); Hugo A. Zambrano, Skokie, IL (US); Douglas Peters, Trout Valley, IL (US); Stuart Bain, Martinsville, NJ (US)

(73) Assignee: HSBC Card Services Inc., Mettawa, IL (US)

( * ) Notice: Subject to any disclaimer, the term of this patent is extended or adjusted under 35 U.S.C. 154(b) by 584 days.

(21) Appl. No.: 12/395,614

(22) Filed: Feb. 27, 2009

(65) Prior Publication Data

US 2010/0187303 A1 Jul. 29, 2010

Related U.S. Application Data

(60) Provisional application No. 61/147,011, filed on Jan. 23, 2009, provisional application No. 61/151,480, filed on Feb. 10, 2009.

(51) Int. Cl.
*G06K 5/00* (2006.01)

(52) U.S. Cl. .................. 235/380; 705/14.38; 705/14.64; 705/17; 705/30; 705/67

(58) Field of Classification Search .................. 235/380; 705/14.38, 14.64, 17, 30, 67
See application file for complete search history.

(56) References Cited

U.S. PATENT DOCUMENTS

| | | | |
|---|---|---|---|
| 4,001,550 A | 1/1977 | Schatz | |
| 4,256,955 A | 3/1981 | Giraud et al. | |
| 4,755,660 A | 7/1988 | Nakano et al. | |
| 4,900,903 A | 2/1990 | Wright et al. | |
| 4,908,499 A | 3/1990 | Guion et al. | |
| 4,928,001 A | 5/1990 | Masada et al. | |
| 4,992,646 A | 2/1991 | Collin et al. | |
| 5,097,115 A | 3/1992 | Ogasawara et al. | |
| 5,168,151 A | 12/1992 | Nara et al. | |

(Continued)

FOREIGN PATENT DOCUMENTS

JP 5174249 7/1993

(Continued)

OTHER PUBLICATIONS

International Search Report and Written Opinion, PCT/US07/07743, May 2, 2008.

(Continued)

*Primary Examiner* — Allyson Trail
(74) *Attorney, Agent, or Firm* — Faegre Baker Daniels LLP

(57) ABSTRACT

Systems and methods for the generation of user identification strings (UIS) used with multi-function operation vehicles are provided. In some embodiments, a system for activating a user operation vehicle can include an activation portal, a verifier and a UIS generator. The activation portal can request a base UIS and a vehicle code identifying a user operation vehicle be supplied by a user. Then, using an encryptor and a communications module, the activation portal can generate an encrypted base UIS and communicate the encrypted base UIS and the vehicle code to the verifier. The verifier can then authenticate the user and identify functions that are linked to the user operation vehicle. The UIS generator can include a decryptor and a UIS generation module to generate a unique account-specific UIS from the encrypted base UIS for each account linked to the user operation vehicle by modifying the base UIS.

59 Claims, 21 Drawing Sheets

U.S. PATENT DOCUMENTS

| | | |
|---|---|---|
| 5,352,875 A | 10/1994 | Enomoto et al. |
| 5,473,690 A | 12/1995 | Grimonprez et al. |
| 5,530,232 A | 6/1996 | Taylor |
| 5,557,518 A | 9/1996 | Rosen |
| 5,574,269 A | 11/1996 | Mori et al. |
| 5,649,118 A | 7/1997 | Carlisle et al. |
| 5,699,528 A | 12/1997 | Hogan |
| 5,729,717 A | 3/1998 | Tamada et al. |
| 5,748,737 A | 5/1998 | Daggar |
| 5,887,064 A | 3/1999 | Seysen et al. |
| 5,959,277 A | 9/1999 | Lucero |
| 5,991,749 A | 11/1999 | Morrill, Jr. |
| 6,032,136 A | 2/2000 | Brake, Jr. |
| 6,065,675 A | 5/2000 | Teicher |
| RE36,788 E | 7/2000 | Mansvelt et al. |
| 6,085,976 A | 7/2000 | Sehr |
| 6,179,205 B1 | 1/2001 | Sloan |
| 6,220,510 B1 | 4/2001 | Everett et al. |
| 6,233,683 B1 | 5/2001 | Chan et al. |
| 6,327,573 B1 | 12/2001 | Walker |
| 6,367,011 B1 | 4/2002 | Lee et al. |
| 6,402,028 B1 | 6/2002 | Graham, Jr. et al. |
| 6,421,729 B1 | 7/2002 | Paltenghe et al. |
| 6,427,909 B1 | 8/2002 | Barnes et al. |
| 6,431,443 B1 | 8/2002 | Barnes et al. |
| 6,434,534 B1 | 8/2002 | Walker et al. |
| 6,450,407 B1 | 9/2002 | Freeman et al. |
| 6,505,772 B1 | 1/2003 | Mollett et al. |
| 6,549,912 B1 | 4/2003 | Chen |
| 6,845,906 B2 | 1/2005 | Royer et al. |
| 6,865,547 B1 | 3/2005 | Brake, Jr. |
| 6,882,984 B1 | 4/2005 | Boyle et al. |
| 6,886,741 B1 | 5/2005 | Salveson |
| 6,957,776 B1 | 10/2005 | Ng |
| 7,072,864 B2 | 7/2006 | Brake, Jr. et al. |
| 7,134,087 B2 | 11/2006 | Bushold et al. |
| 7,225,156 B2 | 5/2007 | Fisher |
| 7,240,364 B1 | 7/2007 | Branscomb et al. |
| 7,263,507 B1 | 8/2007 | Brake, Jr. et al. |
| 7,318,049 B2 | 1/2008 | Iannacci |
| 7,591,419 B2 | 9/2009 | Eckert |
| 7,860,789 B2 | 12/2010 | Hirka et al. |
| 2001/0011248 A1 | 8/2001 | Himmel et al. |
| 2001/0032878 A1 | 10/2001 | Tsiounis et al. |
| 2002/0013728 A1 | 1/2002 | Wilkman |
| 2002/0026394 A1 | 2/2002 | Savage et al. |
| 2002/0032609 A1 | 3/2002 | Wilkman |
| 2002/0040344 A1 | 4/2002 | Preiser et al. |
| 2002/0052841 A1 | 5/2002 | Guthrie et al. |
| 2002/0065712 A1 | 5/2002 | Kawan |
| 2002/0107797 A1 | 8/2002 | Combaluzier |
| 2002/0143709 A1 | 10/2002 | Diveley |
| 2002/0188509 A1 | 12/2002 | Ariff |
| 2003/0036950 A1 | 2/2003 | Nguyen |
| 2003/0061093 A1 | 3/2003 | Todd |
| 2003/0088462 A1 | 5/2003 | Carrithers et al. |
| 2003/0101131 A1 | 5/2003 | Warren |
| 2003/0212595 A1 | 11/2003 | Antonucci |
| 2003/0236704 A1 | 12/2003 | Antonucci |
| 2003/0236747 A1 | 12/2003 | Sager |
| 2004/0122736 A1 | 6/2004 | Strock |
| 2004/0155101 A1 | 8/2004 | Royer et al. |
| 2004/0215507 A1 | 10/2004 | Levitt |
| 2004/0249753 A1 | 12/2004 | Blinn et al. |
| 2004/0254891 A1 | 12/2004 | Blinn et al. |
| 2004/0260647 A1 | 12/2004 | Blinn et al. |
| 2005/0055296 A1 | 3/2005 | Hattersley et al. |
| 2005/0133590 A1 | 6/2005 | Rettenmyer |
| 2005/0171898 A1 | 8/2005 | Bishop et al. |
| 2005/0184146 A1 | 8/2005 | Hoch |
| 2005/0211765 A1 | 9/2005 | Brown et al. |
| 2005/0234820 A1 | 10/2005 | Mackouse |
| 2006/0010033 A1 | 1/2006 | Thomas |
| 2006/0106691 A1 | 5/2006 | Sheaffer |
| 2006/0224449 A1 | 10/2006 | Byerley et al. |
| 2006/0259390 A1 | 11/2006 | Rosenberger |
| 2006/0261144 A1 | 11/2006 | Foss |
| 2006/0271432 A1 | 11/2006 | Sickel |
| 2007/0150411 A1 | 6/2007 | Addepalli |
| 2007/0168282 A1 | 7/2007 | Giordano |
| 2007/0228156 A1 | 10/2007 | Eckert |
| 2007/0228157 A1 | 10/2007 | Eckert |
| 2008/0010189 A1 | 1/2008 | Rosenberger |
| 2008/0097857 A1 | 4/2008 | Walker |
| 2008/0126145 A1* | 5/2008 | Rackley III et al. ............... 705/7 |
| 2009/0018916 A1 | 1/2009 | Seven et al. |
| 2010/0042517 A1* | 2/2010 | Paintin et al. ................... 705/30 |
| 2010/0145861 A1* | 6/2010 | Law et al. ...................... 705/76 |
| 2010/0251008 A1* | 9/2010 | Swildens ........................ 714/4 |
| 2011/0168775 A1 | 7/2011 | Van Zetten |

FOREIGN PATENT DOCUMENTS

| | | |
|---|---|---|
| WO | WO0104851 | 1/2001 |
| WO | 0214985 A2 | 2/2002 |
| WO | WO2007126936 | 11/2007 |
| WO | WO 008016398 | 2/2008 |

OTHER PUBLICATIONS

Office Action dated May 5, 2008 for U.S. Appl. No. 11/496,497.

Office Action dated May 29, 2008 for U.S. Appl. No. 11/496,495.

International Search Report and Written Opinion, PCT/US07/07740, Jul. 2, 2008.

International Preliminary Report on Patentability for PCT Application No. PCT/US2007/007740 dated Oct. 9, 2008.

Office Action dated Dec. 10, 2008 for U.S. Appl. No. 11/496,495.

Notice of Allowance dated Jan. 5, 2009 for U.S. Appl. No. 11/496,497.

International Preliminary Report on Patentability for PCT Application No. PCT/US2007/007743 dated Feb. 12, 2009.

U.S. Appl. No. 12/395,604, filed Feb. 27, 2009.

Notice of Allowance dated May 6, 2009 for U.S. Appl. No. 11/496,497.

Bielski, L. "Enter the "supermarket card"—Is the much maligned chip card headed for a growth spurt?" ABA Banking Journal, vol. 91, No. 6, pp. 56, 58 and 60 (1999).

Bowry, K. "Smart Cards Get Clever Applications" Telecommunications, vol. 27, Issue 11, p. 47-49 (1993).

Bright, R. "Into a 3rd Generation—Active Card", Smart Card '88: International Conference and Workshop on Smart Card Applications and Technologies, p. 6 (1988).

Coleman, L. "Smart Card, Coupon Eater Targeted to Grocery Retailers" Marketing News, vol. 22, No. 12, p. 1 (1988).

Cross, R. "Smart cards for the intelligent shopper" Direct Marketing, vol. 58, No. 12, pp. 30-34 (1996).

"Customer Loyalty Reward System for Restaurants" Previewing IP.COM 000004459D.

Deverell, P. "The Smart Choice" Telecommunications, Dedham, vol. 27, Issue 3, p. 57-59 (1993).

Ferguson, Rick "Using private label credit cards as a loyalty tool," Journal of Consumer Marketing, 2006, vol. 23, No. 7, pp. 374-378.

Hong, et al. "Design and implementation of the system provide of the loyalty service for electronic commerce" Journal of Kiss (C) (Computing Practices), vol. 6, No. 3 (2000).

Iovacchini, A. "Smart Cards Offer Capability of a PC in Your Pocket" Bank Systems and Equipments, vol. 22, No. 7, pp. 94-98 (1985).

Lucas, P. "Another Chance for Chip Cards" Credit Card Management, New York, vol. 6, Issue 6, pp. 30-39 (1993).

Madan, M.S. et al. "Data Processing Aspects of the Integrated Circuit and Magnet Strip Cards" Information & Management, Amsterdam, vol. 22, Issue 1, pp. 41-52 (1992).

"NCR, AT&T Usher in Smart ATM Technology" Computerworld, Framingham, vol. 26, Issue 50, p. 24 (1992).

"Pocket Computer's Potential Power" Accountancy, London, vol. 105, Issue 1161, p. 128 (1990).

Svigals, J. "Here Comes the Multipurpose Card" American Bander, vol. 157, Issue 50, p. 4 (1992).

"The Future of Bankcard Authorization: Providing Incentives With Frequency Programs" Chain Store Age Executive with Shopping Center Age, vol. 69, Issue 10, Sec. 1, pp. 86-87 (1993).

Woodside, B. et al. "A Multi Application Contactless Smart Card Applied to Metering" Sixth International Conference on Metering Apparatus and Tariffs for Electricity Supply (Conf. Publ. No. 317), Manchester, UK (1990).

Office Action mailed Jul. 9, 2009 from USPTO for U.S. Appl. No. 11/496,495.

Office Action mailed Jan. 25, 2010 from USPTO for U.S. Appl. No. 11/496,495.

* cited by examiner

Update Your Card and Identity — 300

- Card Number: — 305
- Loyalty Number on Card (Printed below bar code): — 310
- First Name: — 315
- Last Name: — 320
- Date of Birth: mm/dd/yyyy — 325
- Email Address: — 330

FIG. 3A

Create UIS — 340, 345

Create UIS

UIS should be 4 digits. Spaces and special characters are not allowed

Verify UIS — 350

[SUBMIT>>] [CANCEL] — 355

FIG. 3B

UIS Details — 360, 365

Change UIS

UIS should be 4 digits. Spaces and special characters are not allowed

Verify New UIS — 370

[SUBMIT>>] [CANCEL] — 375

FIG. 3C

UIS Assignment Complete

The UIS for your card has been assigned as the first 4 digits of your home telephone number, beginning with area code

Please do not write or share your selected UIS with anyone. HSBC will never ask you for your UIS for any reason If you decide to change your UIS in the future, please choose the Change UIS function and review the information about our Java™ application that we use to securely change UIS values.

[ Continue >> ] [ Cancel ]

FIG. 5A

UIS Assignment Complete

The UIS for your card has been assigned as the first 4 digits of your primary residence's zipcode

Please do not write or share your selected UIS with anyone. HSBC will never ask you for your UIS for any reason.

If you decide to change your UIS in the future, please choose the Change UIS function and review the information about our Java™ application that we use to securely change UIS values.

[ Continue >> ] [ Cancel ]

FIG. 5B

UIS Assignment Complete

The UIS for your card has been assigned as the last 4 digits of your Social Security Number

Please do not write or share your selected UIS with anyone. HSBC will never ask you for your UIS for any reason If you decide to change your UIS in the future, please choose the Change UIS function and review the information about our Java™ application that we use to securely change UIS values

[ Continue >> ] [ Cancel ]

FIG. 5C

SYSTEMS AND METHODS FOR USER IDENTIFICATION STRING GENERATION FOR SELECTION OF A FUNCTION

CROSS-REFERENCE TO RELATED APPLICATIONS

This application claims the benefit of U.S. Provisional Application No. 61/147,011, filed on Jan. 23, 2009 and U.S. Provisional Application No. 61/151,480, filed on Feb. 10, 2009, both of which are hereby incorporated by reference in their entirety for all purposes.

This application is related to the United States patent application entitled "Systems and Methods Adding Functionality to a UIS for Use at a Point of Interaction," with application Ser. No. 12/395,604, filed on the same day as the present application, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2009 HSBC Private Label Corporation

TECHNICAL FIELD

Some embodiments of the present invention generally relate to multi-function user operation vehicles. More specifically, some embodiments of the present invention relate to systems and methods for the generation of multiple user identification strings (UIS) used with a multi-function user operation vehicle that can be used for selection of a function.

BACKGROUND

There are a variety of payment functions currently in common use. Examples include credit, debit, and prepaid. Historically, one payment function or account was associated with each card. Consequently, when a consumer desired to purchase an item using a particular account the consumer was required to present the appropriate payment device to the point of sale (PoS) system. For example, when a consumer is buying groceries with a debit card, the user would have to present the debit card. Similarly, when the consumer is shopping at a department store with a credit card, the consumer would have to present the credit card. More recently, however, multi-function cards have been introduced that allow a consumer to have multiple accounts associated with a single payment device.

However, many PoS systems and devices are not designed to handle multi-function cards. As such, there are a number of challenges and inefficiencies created in traditional infrastructure for processing payments with multi-function payment devices, transferring funds, and activating multi-function payment devices. For example, transactions through point of sale (PoS) systems using a multi-function card will require the selection of a payment function. However, traditional systems have limited mechanisms designed for function selection. It is with respect to these and other problems that embodiments of the present invention have been made.

SUMMARY

Systems and methods are described for the generation of account-specific user identification strings (UIS) used with multi-function operation vehicles. In some embodiments of the present invention, an encrypted base user identification string (UIS) is received at a UIS generation system from an activation portal used to activate a user operation vehicle. According to some embodiments, the encrypted base UIS is decrypted using a decryptor and a determination of a list of accounts linked to the user operation vehicle is made (e.g., by a linkage determiner). Then, for each function linked to the user operation vehicle an account-specific UIS is generated. For example, in some embodiments, the account-specific UIS generated for each account can be created by modifying the base UIS for each account linked to the user operation vehicle. As such, each account is given an account-specific UIS. Therefore, when a user uses the user operation vehicle to make a deduction request using point of interaction (POI) devices, the user can enter the account-specific UIS associated with the function the consumer desires to use to complete the authorization request.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIGS. 3A-3C illustrate examples of screenshots for a user operation vehicle activation interface that may be used in accordance with some embodiments of the present invention;

FIGS. 5A-5C illustrate examples of webpages that can convey the selected base UIS to the user without actually displaying the UIS on the webpage in accordance with some embodiments of the present invention;

Figure 1:
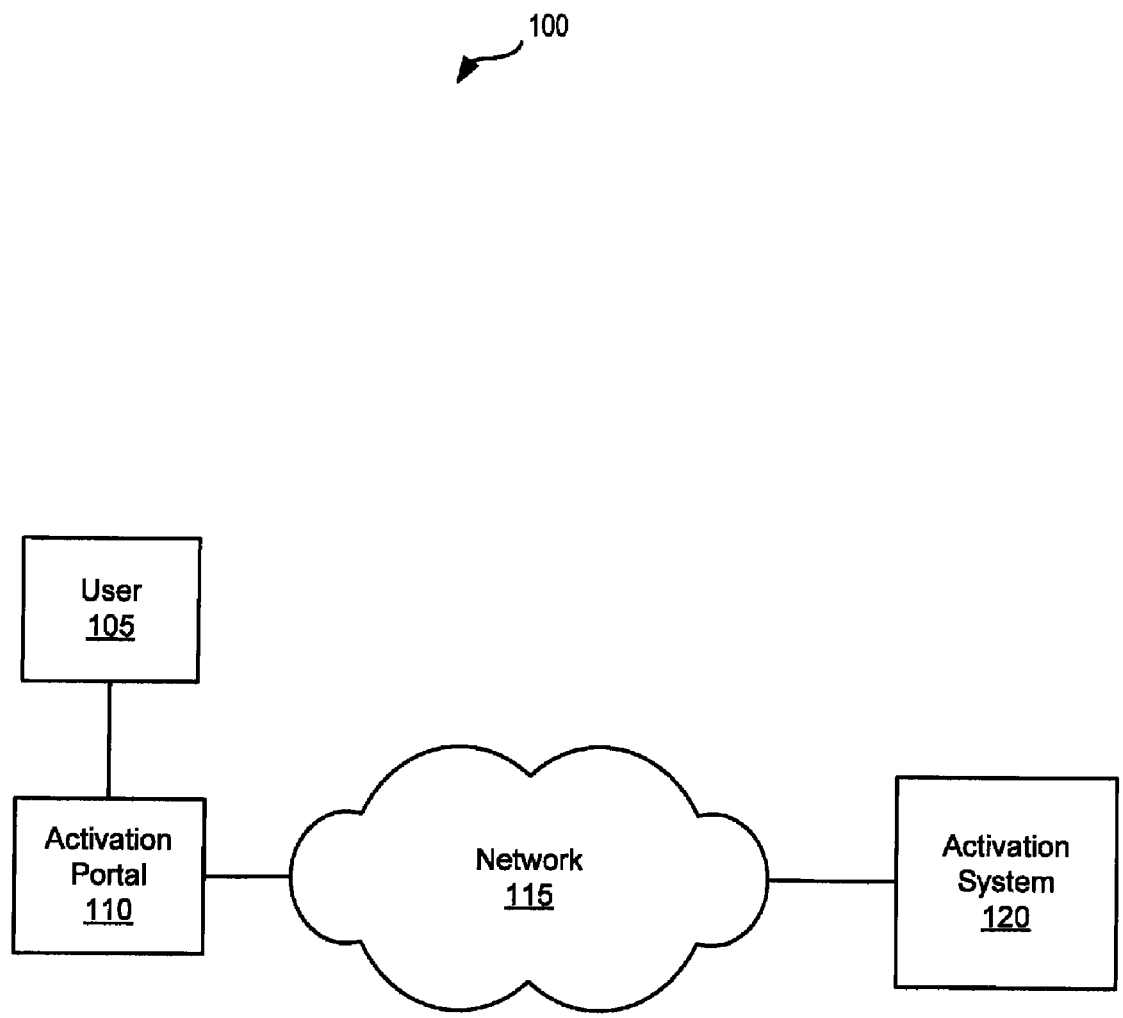
FIG. 1 illustrates an example of an activation environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Some embodiments of the present invention generally relate to multi-function user operation vehicles. More specifically, some embodiments of the present invention relate to systems and methods for the generation of user identification strings used with multi-function operation vehicles and to the addition of functionality to a user identification string for use at a point of interaction (POI) (e.g., a point of sale, computer-based interface such as a webpage, computer integrated system, telephone payment system, or others).

Various systems and methods are described for generating multiple user identification strings (UIS) for use with a multi-function user operation vehicle. In some embodiments, a user operation vehicle activation system monitors for a set UIS request or a change UIS request. When a request to set or change the UIS is detected, an interface portal is generated that allows a user to enter a new base UIS. The interface portal can be designed to allow for entry of any string of alphanumeric characters that meet preset parameters. For example, in some embodiments, the preset parameters could require the base UIS entered by the user to be a four digit numerical code (e.g., 2319). According to some embodiments, the UIS portal can be a webpage, a Java™ application, a downloadable computer program, and/or the like. Once a base UIS is received, the base UIS can be encrypted and transferred to a UIS generation system which can be part of the user activation system in some embodiments.

After the encrypted UIS is received at the user operation vehicle activation system, the encrypted UIS is decrypted and a determination can be made about which accounts and promotions are to be linked to the user operation vehicle. Various methods can be used for determining the accounts to be linked to the user operation vehicle. For example, in some embodiments, the determination can be made by searching an account database for accounts that can be linked with the received user operation vehicle identification information. Every account found can be linked automatically or a user can select which accounts should be linked through an account user interface screen that is displayed.

In some embodiments of the present invention, the account user interface screen is displayed through the interface portal and includes a list of the accounts found in the account database that can be linked with the user operation vehicle. In some embodiments, the screen allows for the user to enter additional account information (e.g., from other financial institutions) for accounts that were not found in the account database and that the user desires to be linked to the user operation vehicle.

Once the determination or selection is made about which accounts are to be linked to the user operation vehicle, the results are transferred to a UIS generation module where an account-specific UIS is generated for each account linked to the user operation. In accordance with some embodiments of the present invention, the account-specific UIS generated for each account is unique and can be generated in a variety of ways (e.g., by appending one or more additional numbers or characters to the first UIS for each account linked to the user operation vehicle). As a simple example, suppose a user entered a base UIS of 4719 for a user operation vehicle with an associated credit function, debit function, and accumulated value function. The UIS generation module could generate an account-specific UIS of 47191 for the credit function, 47192 for the debit function, and 47193 for the accumulated value function.

One advantage of some embodiments of the present invention is that a user does not have to enter more than one UIS because the system automatically creates a unique UIS for each linked account. Then, according to some embodiments, these account-specific UIS's can be used at a POI (e.g., PoS) device during a transaction (e.g., a purchase) to request which payment function(s) and/or account(s) associated with the user operation vehicle should be used.

Some embodiments of the present invention provide for systems and methods that add functionality to a user identification string for use at a POI. Accordingly, in those embodiments, a user can append a user code of additional characters (e.g., numbers, letters, special characters, and the like), to the end of the UIS at a POI device to create a modified user identification string. In some embodiments, these additional characters only include numbers. Whether the additional characters in the user code are just numbers or include some combination of numbers, letters, and/or special characters, the additional characters can be used to add functionality to the UIS at a POI. For example, in some embodiments, the additional characters could be a reward code.

The POI device takes the available information and creates a string of characters referred to as a transaction request that includes various pieces of information about the transaction such as, but not limited to, a user operation vehicle identifier or vehicle code (e.g., a primary account number), a user identification string (UIS), a function indicator, a reward code, merchant code, payment amount (function deduction amount), and/or the like. The string of characters is then transmitted to a verification network in accordance with some embodiments of the present invention. In some embodiments, the string of characters is then parsed into various tokens (e.g., pieces of information such as the user operation vehicle identifier, the UIS, the function selector, and/or the reward code) for processing.

According to some embodiments, the user can be validated using one or more of the various tokens. For example, the validation in some embodiments of the present invention can occur by comparing a UIS stored in a UIS database that is associated with the primary account number with the UIS received in the string of characters. Similarly, a determination of a reward action associated with the reward code can be made. The determination of the reward action can occur in a number of different ways according to various embodiments of the present invention. For example, in some embodiments, the reward determination can be performed by looking up the reward code in a reward code database. As another example, the reward determination can be performed by deciphering the reward code into various tokens that correspond to various reward elements and/or payment types. In some embodiments of the present invention a reward code processing system (reward code processor) can be used to determine one or more reward actions and validate and/or authorize the reward code.

In some embodiments, once the reward code is determined and applied, a payment request (function deduction request) can then be sent for processing. In some embodiments, the payment processing (function deduction processing) occurs through a function indicated by a function indicator included in the string of characters. For example, the payment processing can occur through a rewards processing system, a debit processing system, a credit processing system, a prepaid processing system, and/or the like.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Some embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data embodied in a carrier wave or other propagation medium via a communication link (e.g., a modem or network connection).

While, for convenience, embodiments of the present invention are described with reference to user operation vehicles and UIS, embodiments of the present invention are equally applicable to various other areas where processing orders, rewards, selection of payment options, and selection of service options (e.g., purchase of insurance) may be beneficial. As just one example, instead of generating multiple user identification strings, the system could be used to generate multiple card security codes (i.e., the three or four digit number on the back of a payment device). As such, the security codes could be used for payment function selection.

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of systems and processing devices.

Terminology

Brief definitions of terms, abbreviations, and phrases used throughout this application are given below.

An "accumulated value function" generally describes a payment function that enables a merchant and/or other third party system to track and/or reward specific consumer purchases and/or purchase behavior. For example, rewards can be generated when a product or item is purchased within a certain category code such as merchant, merchant category, product category, etc. The rewards generated by the consumer purchases and/or purchase behavior allow the consumer to spend the accrued reward amounts at a POI. In some embodiments, the accumulated value function may receive rewards from one or more systems and apply the rewards to an account associated with the accumulated value function. According to some embodiments, the accrued reward can be, for example, a point-type system or cash equivalent that can be used by the consumer at the POI through the use of the accumulated value function.

The terms "connected" or "coupled" and related terms are used in an operational sense and are not necessarily limited to a direct physical connection or coupling. Thus, for example, two devices may be coupled directly, or via one or more intermediary media, modules, or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrase "in communication with" generally refers to direct and indirect communications for the exchange of information between two or more devices, modules, applications, systems, components, or the like. For example, two devices may be in communication with each other in such a way that information or access to the devices can be passed therebetween, while not sharing any direct physical connection.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

The phrase "user operation vehicle" generally refers to any device, biometric identifier, or method for conveying information that may be used to conduct a transaction. Examples of user operation vehicles include, but are not limited to, a plastic card with a magnetic strip, a smart card storing information in onboard memory, a card containing only an identifier and linked with a remote database, a card with radio frequency identification (RFID) technology, a fingerprint, a retina pattern, a voice pattern, or any other physical feature that is distinguishable between individuals. In some embodiments, a user operation vehicle could also be any other information such as a memorized code without a corresponding card or device to store or transfer that code.

General Description

FIG. 1 illustrates an example of an activation environment 100 in which some embodiments of the present invention may be utilized. The multi-function user operation vehicle can be any device, biometric identifier, or method for conveying information that may be used to conduct a transaction. The multi-function user operation vehicle can potentially be associated and/or linked with one or more credit functions, debit functions, accumulated value functions, consumer-to-consumer payment functions, reward functions, and/or other types of payment functions. Examples of other types of payment functions include, but are not limited to, loans (e.g., funds from student loans, bank loans, etc.), flexible spending accounts for healthcare payments, payroll from an employer, reimbursements from an employer, petty cash from an employer, corporate incentives, and payments from insurance companies (e.g., automobile, health, pet, etc.).

The user operation vehicle in some embodiments of the present invention includes a user operation vehicle identifier (vehicle code) that is used to identify the user operation vehicle and can be used to determine which functions are associated and/or linked to the user operation vehicle. One example of a user operation vehicle identifier is a primary account number. In some embodiments, the user operation vehicle identifiers can be the user operation vehicle itself or separate additional identifiers. Examples include, but are not limited to RFID signatures, a fingerprint of an authorized user, a retina pattern of an authorized user, a voice pattern of an authorized user, and physical identifiers.

A user operation vehicle may be issued to a user after opening one or more accounts with a financial institution or merchant and requesting a user operation vehicle to link multiple open accounts that are with one or more financial institutions, merchants, insurance carriers, employers, etc. For example, in some embodiments, a user may be issued a user operation vehicle after applying for and being granted a loan. The user operation vehicle would be linked automatically to the loan amount, allowing the user to access the funds through the user operation vehicle. As another example, a gift card ordering service may be used to associate a prepaid gift card with the user operation vehicle.

The user operation vehicle may or may not be activated initially. In addition, the user operation vehicle may or may not be initially associated and/or initially linked with any payment functions. To activate the user operation vehicle, associate payment functions, and/or link payment functions, user 105 can use an activation portal 110. The user can be directed to activation portal 110 through informational communications such as flyers, e-mails, telephone calls, or other communications that tell the user how to access the activation port 110. According to some embodiments, the informational communications can contain webpage addresses, telephone numbers, e-mail addresses, postal addresses, and the like that can be used for activating the user operation vehicle.

In accordance with some embodiments, activation portal 110 provides an interface through network 115 to activation system 120 to activate the user operation vehicles. Activation portal 110 can be any type of interface that facilitates the exchange of information required by activation system 120 for user operation vehicle activation. In some embodiments, activation portal 110 can be, but is not limited to, a telephone, a computer, a computer program, a webpage, a Java™ application, and/or the like. Examples of the types of information used for user operation vehicle activation in some embodiments of the present invention include items such as user identification information, UIS entry and/or selection, entry and/or selection of accounts to be linked to the user operation vehicle, and/or other information as will be appreciated by those of ordinary skill in the art.

Once the requested information is collected from the user through activation portal 110, the information is transferred across network 115 to activation system 120. Network 115 can be any group of interconnected devices capable of exchanging information. In some embodiments, network 115 may be as few as several personal computers on a Local Area Network (LAN) or as large as the Internet. Network 115 may also be a Voice over Internet Protocol (VoIP) network or a Voice Response Unit (VRU) according to some embodiments of the present invention. In some cases, network 115 may be comprised of multiple networks (private and/or public), even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Activation system 120 can include, or be in communication with, various components such as a user verification system, a UIS generation system, a payment verification system, an account verification system, various databases for storing generated UIS, and/or the like. According to some embodiments, a user verification system can be used to verify user credentials or identification information (e.g., user name and password, voice authentication, calling from a known phone number, etc.) before access is allowed to activation system 120. Once access is granted, activation system 120 can use a UIS generation system to generate a UIS for each linked account, an account verification system to verify which accounts can be linked to the user operation vehicle, and/or a payment verification system with various databases to store generated UIS and account information. In addition, in some embodiments, a linkage generator can be used to link accounts/functions to the user operation vehicle. In accordance with some embodiments, the UIS can be any string of alphanumeric characters including, but not limited to, numbers, letters, special characters, etc. that can be used to identify and/or authorize the user of a user operation vehicle. For example, the UIS can be a personal identification number (PIN). In some embodiments, the UIS may indicate which function is being used to complete the transaction, a reward to be used, or other feature.

According to some embodiments, activation system 120 monitors for a set UIS request or a change UIS request from user 105. The set or change request can come through activation portal 110 via network 115. When a request to set or change the UIS is detected in some embodiments, an activation portal response is generated that allows a user to enter a new base UIS or choose a system selected UIS. The activation portal response can be designed to allow for entry of any string of alphanumeric characters that meet preset parameters. For example, in some embodiments, the activation portal response includes the display of a webpage where the preset parameters are set so that the base UIS entered by the user should be a four digit numerical code (e.g., 2319).

Figure 2:
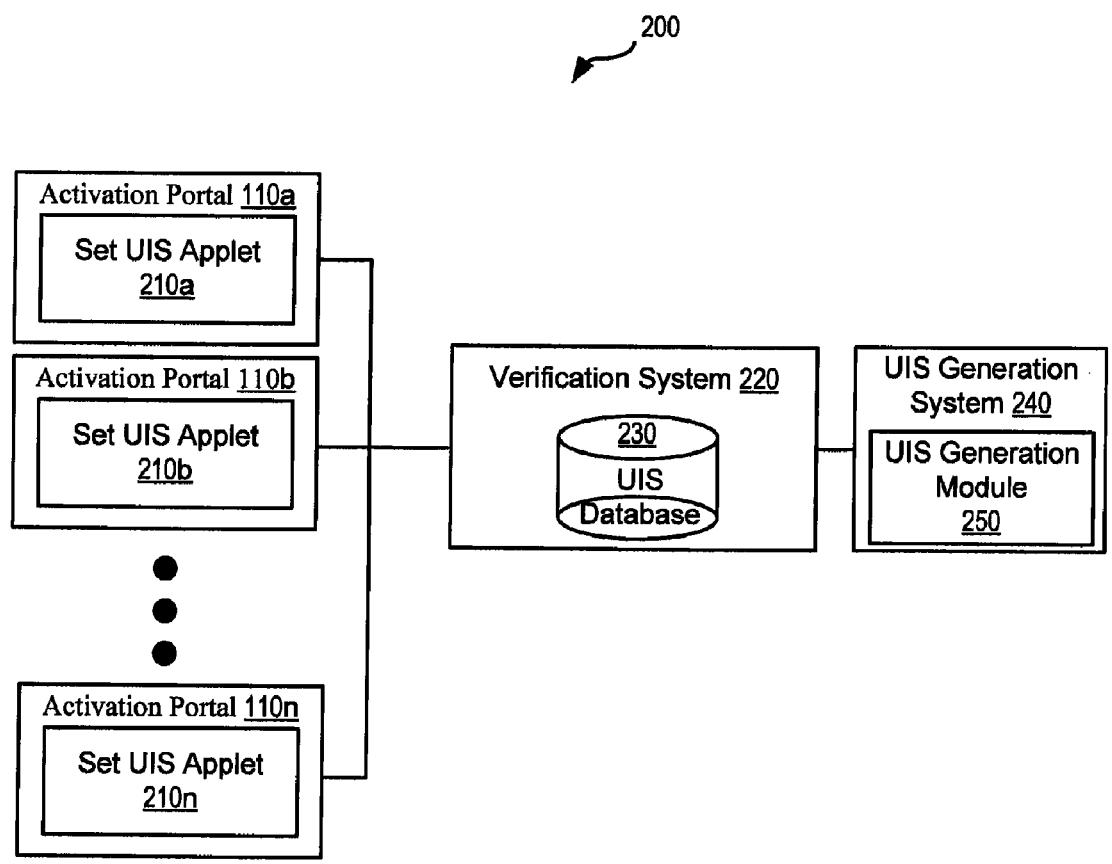
FIG. 2 illustrates an example of a user identification string (UIS) generation system with various components that can be used in accordance with some embodiments of the present invention.

FIG. 2 illustrates an example of a user identification string (UIS) generation environment 200 with various components that can be used in accordance with some embodiments of the present invention. One or more activation portals 110a-110n can use set UIS interface/applets 210a-210n for the entry of a new base UIS. According to some embodiments, set UIS interface/applet 210 can be displayed in response to a set or change UIS request. The set UIS interface/applet can be a webpage, a part of a webpage, a Java™ application, a downloadable computer program, a computer application, and/or the like.

Once a base UIS is received from a user via activation portal 110, the base UIS can then be encrypted by an encryption/decryption module (encryptor or decryptor) associated with activation portal 110. In some embodiments, the encrypted UIS is transferred to account verification system 220 where a determination can be made as to which accounts can be associated and/or linked to the user operation vehicle. Examples of the types of accounts that can be associated and/or linked to the user operation vehicle include, but are not limited to, credit accounts, debit accounts, prepaid accounts, accumulated value accounts, store value accounts, consumer-to-consumer payment accounts, reward accounts, and/or other types of accounts.

In some embodiments, verification system 220 can identify origination information (e.g., IP address, user token, etc.). The origination information identified by verification system 220 can be used in some embodiments for tracking marketing penetration by channel (e.g., webpage, web address, phone calls, etc.).

In some cases, verification system 220 causes an account user interface screen to be displayed through the activation portal 110. In other embodiments, the account user interface screen is part of set UIS interface/applet 210. In either case, the account user interface screen is capable of receiving information from the user about one or more accounts the user desires to be associated with the user operation vehicle. In some cases, one or more sets of account information can be automatically populated from information the user supplied on an application or with information about other accounts that are already available. Examples of the types of information that can be requested from the user include, but are not limited to, account numbers, first name, last name, e-mail address, user operation vehicle identification number (if applicable), birthdays, government identification (e.g., driver's license, social security number, etc.), mother's maiden name, billing addresses, answers to security questions, user IDs, passwords and/or the like.

Once the desired account information is received, the information can be transferred to verification module (verifier) 220 where the account information entered by the user can be verified. If the account passes the verification process, then the account information is transferred to UIS generation module 240 where UIS generation module 250 generates an account (i.e., account-specific) UIS for each verified account or for a subset of the verified accounts. As one example, UIS generation module 250 can generate the account-specific UIS by appending one or more additional numbers after the base UIS entered by the user. The account-specific UIS for each verified account can then be stored in UIS database 230 for verification during transaction processing (e.g., processing an authorization request). In some embodiments, between five and twenty account-specific UIS's can be generated. In other embodiments, fewer than five or more than twenty account-specific UIS's can be generated.

Some embodiments provide for the generation of a completion screen for display through activation portal 110 once the account-specific UIS generation is completed. The completion screen can provide an indication to the user that the automatic generation of the account-specific UIS for each account (or payment function) linked to the user operation vehicle is complete. In some embodiments, the completion screen can display a list of the account-specific UIS's generated for each account. The completion screen, in some embodiments, can include a graphical user interface that allows the user to associate an account-specific UIS for one account with another account.

In some embodiments, the account or the account-specific UIS generated for each account can be associated with signature default and/or a set order of precedence to be used for transactions received from the POI. For example, if the user uses the multifunction user operation vehicle without entering a UIS for the selection of a particular function (e.g., a signature-based authorization), then the user can select which of the multiple accounts (e.g., the second credit account) will automatically or implicitly be used. The user may continue to assign a prioritization to each account (or a default sequence of account use) in the event an account with a higher priority has insufficient funds or is otherwise not able to complete the transaction individually (e.g., a maximum transaction amount has been reached).

In some embodiments, the user may also assign an individual transaction limit below a system threshold for one or more user operation vehicle functions. For example, suppose the user set an order of precedence in the following order: accumulated value, debit, and then line of credit. Further suppose that the user had a current accrued value of twenty three dollars, a system threshold debit limit of three hundred dollars, and a system threshold credit limit of five hundred dollars. The user may decide to set a limit (e.g., one hundred fifty dollar limit) for the debit line in the event that the accumulated value function has insufficient accrued value. Now, suppose the user makes a two hundred fifty dollar transaction. Twenty three dollars will be charged to the accumulated value function, one hundred and fifty to the debit function, and then the final seventy seven dollars to the credit function. As another example, instead of making a two hundred fifty dollar transaction, suppose the user made a forty dollar transaction. Then, twenty three dollars will be charged to the accumulated value function, seventeen dollars to the debit function, and nothing to the credit function.

As a further example of the generation, viewing and prioritization of account-specific UIS's, suppose a user entered a base UIS of 3892. An account-specific UIS could then be created as 38921 for a first debit function, 389212 for a second debit function, 38922 for a credit function, 38923 for a first store value function, and 389232 for a second store value function. In some embodiments, no payment function is implicit and no initial priority is associated with the payment functions. In some embodiments, an initial prioritization and implicit payment function (e.g., for signature based authorization) will be automatically assigned based on a set of assignment rules.

The user could then view the account-specific UIS assigned to each account along with the account prioritization information on the completion screen. If desired, the user could then reassociate the account-specific UIS for the credit function (i.e., 38922) with the first account to be implicitly used during a transaction and the first debit account account-specific UIS (i.e., 38921) with the next functional account to be used for a transaction requiring access to multiple accounts in order to fully complete the transaction. Similarly, for example, the user may reassociate the second debit function UIS (i.e., 389212) with the first debit function and the second store value function UIS with the first store value account, and thus change the order of account access precedence.

In some embodiments, the graphical user interface can allow the user to associate the account-specific UIS generated for one account with another account without changing the set order of precedence of account usage during a transaction. Similarly, some embodiments allow the user to change the set order of precedence to be used for transactions received from the POI without changing the account-specific UIS associated with the accounts.

The user, in some embodiments of the present invention, may select and setup one or more special features using the graphical user interface. For example, in addition to setting a base UIS, activating the user operation vehicle, setting account order precedence, setting individual transaction limits and the like, some embodiments allow for a rounding sweep. The rounding sweep allows the user to round the transaction up to a nearest amount (e.g., nearest fifty cents, whole dollar, five dollar, etc.) and have the difference between the transaction amount and the rounded amount applied to another function (e.g., accumulated value, savings account, credit account etc.). In accordance with various embodiments, the user can select the nearest amount and the destination account where the difference should be placed.

In some embodiments of the present invention, the account activation process occurs through one or more user interface screens displayed through activation portal 110. For example, a first user interface screen can be displayed on a terminal in response to a request to activate a user operation vehicle received through the activation portal 110. The first user interface screen is generally capable of receiving one or more accounts to be associated and/or linked to a user operation vehicle and is operable to send a linking request to a user operation vehicle activation system 120.

In response to the linking request, a second user interface screen can be displayed on the terminal in accordance with various embodiments of the present invention. In these embodiments, the second user interface screen is able to display the linking and/or activation status for each of the one or more accounts received on the first user interface screen. For example, in some embodiments, a label, symbol, phrase, or other indicator can be presented to the user conveying that an account is currently not linked to the user operation vehicle, linked to the user operation vehicle, or a linking request is being processed.

A request for the user to enter a base UIS to be associated with the user operation vehicle can be made through a third user interface screen displayed on the terminal. The third user interface screen can, for example, transmit the base UIS entered by the user to the UIS generation system 240 to generate the second UIS for each successfully linked account. In response to a communication from the user operation vehicle activation system 120, a fourth user interface screen can be presented which displays the second UIS for each of the one or more accounts successfully linked.

FIGS. 3A-3C illustrate examples of screenshots for the account activation process that can occur through one or more user interface screens displayed through activation portal 110 that may be used in accordance with some embodiments of the present invention. FIG. 3A shows an example of an account user interface screen 300 that can be used in some embodiments. Account user interface screen 300 as illustrated in FIG. 3A can be used for collecting account information about accounts to be potentially linked to a user operation vehicle, for verifying a user and user operation vehicle for activation purposes, and/or for creating a new UIS.

In accordance with some embodiments of the present invention, any number of different types of information can be requested from the user using account user interface screen 300. Account user interface screen 300, as illustrated, requests a user input a user operation vehicle identification number in entry box 305, loyalty number on the user operation vehicle in entry box 310, the user's first and last names in entry boxes 315 and 320, respectively, user's data of birth in entry box 325, and a current e-mail address in entry box 330. In some embodiments, the type of information requested on account user interface screen 300 may depend on the current function of the interface screen (e.g., account activation vs. account maintenance). Examples of other types of information that can be requested, include, but are not limited to, current user billing address, bank information (e.g., addresses, telephone numbers, routing numbers, etc.) for the account desired to be linked, personal identification numbers for the account desired to be linked, account numbers for the account desired to be linked, mother's maiden name, answers to security questions, user ID's, passwords, and/or the like.

FIG. 3B shows an example of a create UIS screen 340 that may be used with a user operation vehicle activation interface in accordance with some embodiments of the present invention. According to some embodiments, create UIS screen 340 can be displayed after the account verification process is completed and a determination was successfully made that the user is authorized to activate the account. In the embodiments shown in FIG. 3B, the user is required to enter a four digit numerical number without spaces or special characters in entry box 345 and entry box 350. However, in other embodiments the code can be of any specified length and/or include special characters, letters, and/or spaces, or be system generated based on the user information provided.

FIG. 3C shows an example of a change UIS screen 360 that may be used with a user operation vehicle activation interface in accordance with some embodiments of the present invention. According to some embodiments, change UIS screen 360 can be displayed after a user successfully logs into the user's account. In the embodiments shown in FIG. 3C, the user is required to enter a four digit numerical number without spaces or special characters in entry box 365 and entry box 370. However, in other embodiments the code can be of any specified length and/or include special characters, letters, and/or spaces.

According to some embodiments of the present invention, once the user hits the submit button (355 or 375) in either create UIS screen 340 or change UIS screen 360, the new base UIS can be transmitted to the UIS generation system 240 where an account-specific UIS is created for each account linked to the user operation vehicle.

As previously described, some embodiments of the present invention use an activation portal to activate a user operation vehicle that can be associated with one or more functions (e.g., credit function, debit function, accumulated value function, consumer to consumer function, reward function, store value function, and others). In particular, some embodiments of the present invention use a Java™ applet for user operation vehicle activation. UIS creation is an example of one task that can be provided during user operation vehicle activation. In some embodiments, Java™ applets are used to provide maximum security and encryption to the customer's base UIS that was entered through the activation portal. For example, in some embodiments, the applets used for account-specific UIS creation ensure that the customer's base UIS is not in clear text anywhere in the system including SSL communications between web servers and application servers.

While Java™ applets address many of the security concerns associated with activating a user operation vehicle and with generating multiple account-specific UIS's, some embodiments can use alternative systems and methods for securely activating the user operation vehicle. Some embodiments of the present invention take advantage of the RSA encryption algorithm for customer UIS encryption before transmitting the base UIS to a UIS generation system. In particular, the RSA algorithm used in some embodiments may be part of Java™ 5 and the applet classes may be complied with Java™ 5. However, if the customer's browser has any version of Java™ lower than version 5, the UIS creation page may not be displayed as desired. Hence, the customer may seek an alternative solution to the Java™ applet or download a higher version of Java™.

In addition, Java™ applets are not compatible with all browsers (e.g., MAC or Safari). Moreover, in some embodiments, the applets are client side applications that are downloaded to a client browser. In some cases, the applet may be prevented from loading in the customer's browser. For example, if the applet is trying to run in a client network that restricts any outgoing connections for applets or if the security is set to a maximum level in the client browser. For these situations and others, some embodiments of the present invention provide systems and methods for automatically generating multiple account-specific UIS's in the event of an activation applet failure.

When a customer is activating a user operation vehicle in some embodiments of the present invention, the activation process can direct the customer to a UIS creation applet (e.g., FIG. 3A). In some cases, the user activating the user operation vehicle may desire and alternative to using the applet (e.g., if the user has an incompatible browser). Some embodiments of the present invention provide a hyperlink that the user can select if the user desires an alternate solution to using the Java™ applet. For example, the hyperlink in some embodiments might say, "Having issues seeing the applet? Click here to receive a system generated UIS."

Figure 4:
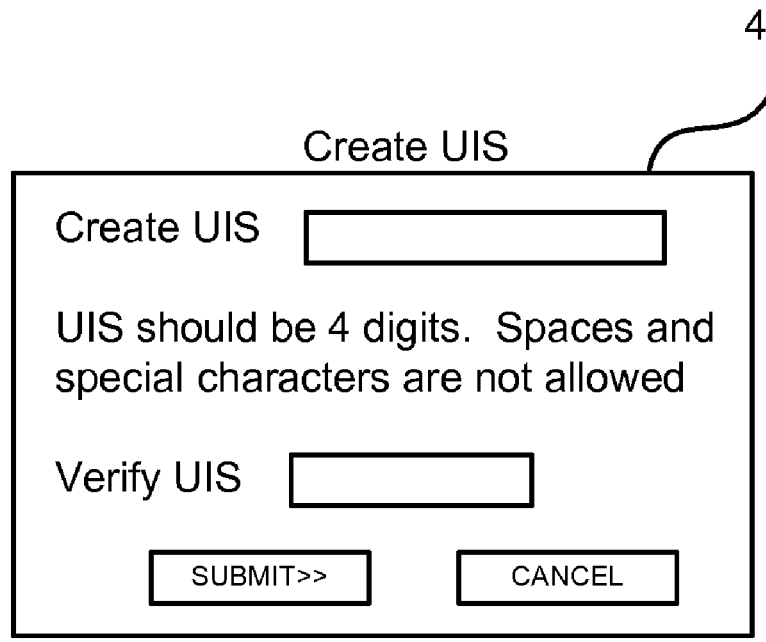
FIG. 4 illustrates an example of a webpage that might include a Java™ applet for collecting a base UIS from a user along with a hyperlink in accordance with some embodiments of the present invention.

FIG. 4 illustrates an example of a webpage 400 that might include a Java™ applet 410 for collecting a base UIS from a user along with a hyperlink 420 in accordance with some embodiments of the present invention. According to some embodiments, link 420 can point to another web page that can display a message asking the user to confirm the automatic generation of the multiple account-specific UIS's using a system selected base UIS. In some embodiments, additional or different text can be provided through webpage 400. For example, some embodiments might include the following text on webpage 400:

Enter Your Information

Please enter a four-digit user identification string (UIS) in the required fields below. Your UIS can be used in lieu of a signature to authorize purchases made with your user operation vehicle and should only be known by you. Please create a UIS that is not easy for anyone else to guess and do not write or share your selected UIS with anyone. We will never ask for your UIS for any reason.

If you are not able to create and verify your new UIS below, please review the Java™ requirements information at the bottom of this page. If you are still unable to create your UIS, or if you would like us to generate a UIS for you please click here to have our system assign your UIS.

In some embodiments, the system selected base UIS may be the last four digits of a number associated with the user (e.g., the user's social security number). The web page can have a statement indicating the selection of the base UIS (e.g., 'Last 4 digits of your SSN have been selected as your initial, or base, UIS for the user operation vehicle. Please click confirm to continue.'). One advantage of automatically selecting the base UIS from a number associated with the user is that the UIS can be conveyed to the user without actually displaying the UIS on a webpage or other mechanism as illustrated in FIG. 5A-5C. Some embodiments provide for a confirmation button to be provided on this page for the user to confirm that they have noted the base UIS number.

According to some embodiments, the system selected base UIS selection can be randomly chosen from one or more pieces of information provided by the user. In some embodiments, a UIS single sign on (SSO) message passed from activation portal to UIS generation system contains a number of numeric fields (e.g., birthday field 325 in FIG. 3A). In accordance with various embodiments, some fields may be mandatory while other fields may be optional. In accordance with some embodiments, a base selection module could be used to select the four digits (e.g., last four digits, first four digits, etc.) from one of those fields (with the field being randomly selected from the available fields) and then use that as the base UIS. In other embodiments, a set of letters, numbers, special characters, and/or a combination thereof may be selected from within the fields.

For example, in some embodiments, the UIS SSO message may contain one or more of the following: social security number (SSN), main zip code, home phone number, mobile phone number, work phone number, ABA number, demand deposit account (DDA) number, birth date, street address, user name, etc. Some embodiments of the present invention may have some, all, or none of these fields along with other possible fields. Some fields may be conditional based on inputs from the user, previously entered information, attempts to link new accounts, etc.

Examples of mandatory fields in some embodiments include, but are not limited to, one or more of the following: main ZIP and home phone (M). Examples of optional fields in some embodiments include, but are not limited to, the following: work phone and mobile phone. Examples of conditional fields in some embodiments include, but are not limited to, one or more of the following: SSN, ABA, DDA, and birth date. In some embodiments, all of the fields listed above may be mandatory or optional. Still yet in some embodiments, some of the examples in one type of field may be in another field type (e.g., main ZIP may be optional, conditional, or mandatory in some embodiments).

To produce an account-specific UIS from a four digit base UIS in accordance with some embodiments of the present invention, one or more numbers, letters, and/or special characters may be appended to the base UIS. For example, the number one may be appended to the beginning of the base UIS and associated with a debit function, the number two may be appended to the beginning of the base UIS and associated with a credit function, the number three may be appended to the beginning of the base UIS and associated with an accumulated value function, the number four may be appended to the beginning of the base UIS and associated with a prepaid function, etc.

As an example, suppose the user confirmed the automatic selection of a base UIS by the UIS generation system and the base selection module selected the last four digits of the user SSN that was 123456789. As such, the system selected base UIS would be 6789. In addition, suppose a credit account, a debit account, an accumulated value account, a prepaid account, and a rewards account are linked to the user operation vehicle. Then, the following table illustrates the account-specific UIS's that would be generated:

| Function Types Linked to the User Operation Vehicle | Base UIS | Account-Specific UIS |
| --- | --- | --- |
| Debit | 6789 | 16789 |
| Credit | 6789 | 26789 |
| Accumulated Value | 6789 | 36789 |
| Prepaid | 6789 | 46789 |
| Rewards | 6789 | 56789 |

From the four digit UIS that was selected by the base selection module, five new five digit UIS's were created. This is only one example of how some embodiments of the present invention may create account-specific UIS's in different manners. As discussed in more detail below, some embodiments may use different account-specific generation logic for the generation of account-specific UIS's.

According to some embodiments, a response can be sent back from the UIS generation system 240 to activation portal 110. The response can include a confirmation page or cause a confirmation page to be displayed through the activation portal that the UIS generation and/or card activation were successful.

Some embodiments of the present invention provide for additional approaches to solving and/or improving the problems and disadvantages associated with using a Java™ applet. In some embodiments, the random selection of the system selected base UIS can be done on demand or through a batch-processing mode. In addition, some embodiments allow for a random base UIS generation option that can be selected by the user even when no problems with the activation portal exist.

Some embodiments of the present invention use a random field selector program to generate a four digit base UIS. In other embodiments, the base UIS may be longer or shorter than four digits and may include letters and/or special characters. There are a variety of different account-specific UIS generation logic sets that can be used to generate the account-specific UIS (e.g., a 5 digit UIS) that can be used in accordance with embodiments of the present invention only one of which was discussed above.

In some embodiments, the activation portal SSO response can be generated with two extra data fields. For example, a field selection data field (e.g. RandomFieldSelected) and a selected digit data field (e.g., SelectedDigits) could be added in some embodiments. The RandomFieldSelected=1 could be used to indicate the SSN number, 2 for the main zip code, 3 for ABA, 4 for DDA, etc. Similarly, the SelectedDigits=1 can be used to indicate the selection of the first four digits of the selected field and 2 for the last four digits of the selected field. The values for these data fields indicate the requested data field that was selected and which part of the data field was used to generate the system generated base UIS. In accordance with some embodiments, the UIS generation system 240 can send a mapping list to the activation portal before using this feature. In other embodiments, the mapping can be sent with the response.

In some embodiments, activation portal 110 can send a confirmation email to the user that the card is activated, the base UIS used (whether entered by the user or system selected), a clue for the user to know which base UIS was used (e.g., the first four digits of your checking account number), and/or the account-specific UIS's that were generated for each account. In some embodiments, the activation portal may only display the confirmation page in the customer browser. One example of a message that can be used in accordance with embodiments of the present invention is "The card has been activated successfully and last four digits of your SSN were used for the user operation vehicle UIS." In other embodiments, a confirmation screen may display only a customer care number and instruct the user to call the number (e.g., immediately, after twenty four hours, or some other time period) to receive the generated account-specific UIs.

According to some embodiments, an account boarding batch file can be sent from the multi-function user operation vehicle core platform to the UIS generation system every night (or other specified time period such as every hour, every two hours, etc.). In some embodiments, the account boarding batch file can contain any new accounts/user operation vehicles boarded in the system. This batch file can be used as a trigger to generate base UIS requests for newly boarded customers. In accordance with some embodiments, the boarding file format can include extra fields that are present in the activation portal SSO request but are not present in existing account boarding files. One example of an extra field is the ABA Number. Additional error codes can also be sent from the UIS generation system 240 to the user operation vehicle core platform for new fields. In some embodiments, the user operation vehicle core platform may contain the processing logic for these error codes.

Some embodiments include batch processing logic for UIS reject records. The UIS generation system can include a processing module to process the account boarding file (and data fields). In addition, some embodiments of the UIS generation system can include an error module to detect errors and inform the user operation vehicle core platform of all new error codes for all the new data fields. Some embodiments of the UIS generation system can select newly boarded customers from the account boarding file and generate customer base UIS's using customer data and can send these to a verification system for recordation. Any reject response from the verification system can be recorded and can be sent to the user operation vehicle core platform in a reject batch file.

Figure 6:
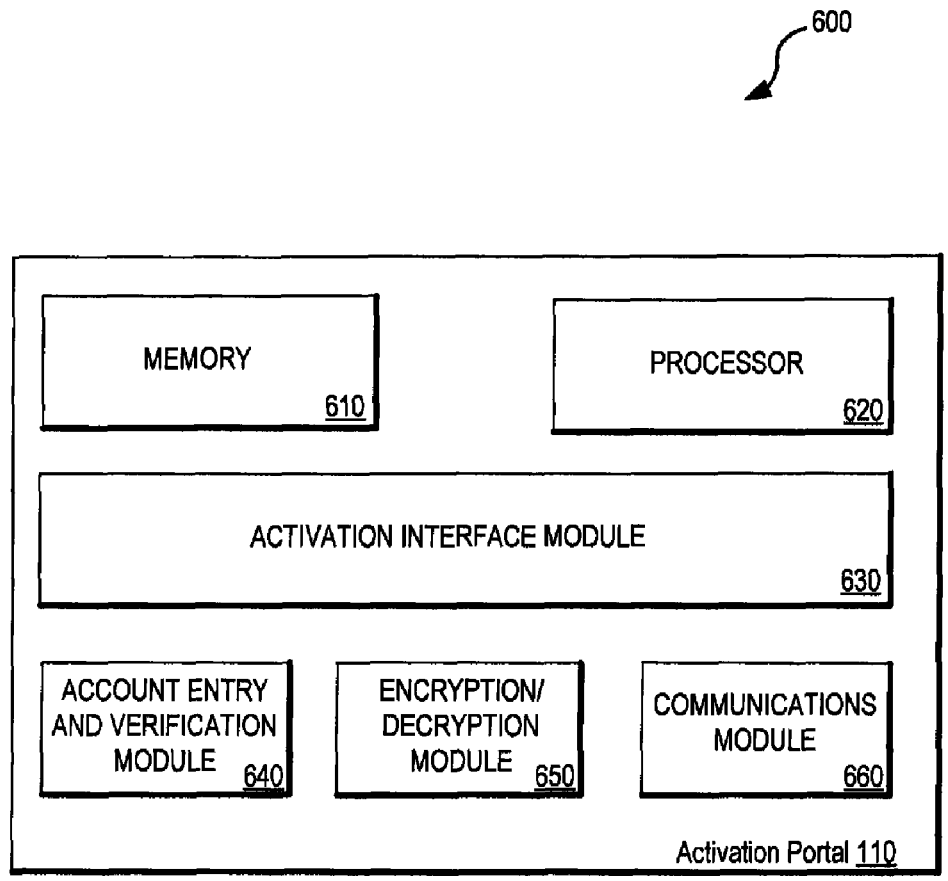
FIG. 6 is a block diagram illustrating components of an activation portal that may be used in accordance with some embodiments of the present invention.

FIG. 6 is a block diagram 600 illustrating components of an activation portal 110 that may be used in accordance with some embodiments of the present invention. According to the embodiments shown in FIG. 6, activation portal 110 can include memory 610, processor 620, activation interface module 630, account entry and verification module 640, encryption/decryption module 650 (sometimes called an encryptor or decryptor), and communications module 660.

Other embodiments of the present invention may include some, all, or none of these modules and components along with other modules or application components. Still yet, some embodiments may incorporate two or more of these modules into a single module and/or associate a portion of the functionality of one or more of these modules with a different module. For example, in some embodiments, the account entry and verification module 640 can be separated into two or more modules. According to some embodiments, activation portal 110 is a component that includes hardware such as memory 610 and processor 620. However, in other embodiments, activation portal 110 refers to a software application that can be run on hardware such as a personal computer.

Memory 610 can be any device or mechanism used for storing information. In accordance with some embodiments of the present invention, memory 610 is intended to encompass any type of, but is not limited to, volatile memory, nonvolatile memory and dynamic memory. For example, memory 610 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 610 may include one or more disk drives, flash drives, databases, local cache memories, processor cache memories, relational databases, flat databases, and/or the like. In addition, those of ordinary skill in the art will appreciate many additional devices and techniques for storing information can be used as memory 610.

Memory 610 may be used to store instructions for running one or more applications or modules on processor 620. For example, memory 610 could be used in some embodiments to house all or some of the instructions needed to execute the functionality of activation interface module 630, account entry and verification module 640, encryption/decryption module 650, and/or communications module 660.

Activation interface module 630, according to some embodiments of the present invention, provides an interface for user 105 to access activation portal 110 and communicate with activation system 120, verification system 220, UIS generation system 240, and/or other components or systems. In some embodiments, activation interface module 630 provides one or more graphical user interfaces that can be displayed on a terminal and allow for interaction from user 105. For example, activation interface module 630 may display account user interface screen 300 as illustrated in FIG. 3A, create UIS screen 340, change UIS screen 360, or others.

In accordance with some embodiments of the present invention, account entry and verification module 640 is operable to receive account information from the user through activation interface module 630. This can be done, for example, through one or more graphical user interfaces (e.g., account user interface screen 300), numerical pad on the phone, or the like. The account information can be the user operation vehicle account information in some embodiments. Accordingly, account entry and verification module 640 takes the received user operation vehicle account information and any additional verification information (e.g., user's birthday, answers to security questions, telephone numbers, and/or the like) and performs a verification check that the user is authorized to access the account.

Once the user operation vehicle account information is verified and the user is granted access to the account, some embodiments allow the user to submit account information about one or more payment functions that the user desires to link to the user operation vehicle. For example, the user could enter account information for one or more credit functions, reward functions, debit functions, prepaid functions, and/or the like. Then account entry and verification module 640 could process the request to verify the authenticity of each account and then link the desired accounts. In accordance with some embodiments, account entry and verification module 640 could use rules set up by system administrators to process the request to verify the accounts can be linked to the user operation vehicle. Examples of the types of rules that may be used include, but are not limited to, correct routing numbers, correct account numbers, only participating institutional accounts can be linked, only accounts from a single user, and/or the like.

In some embodiments, activation interface module 630 is operable to receive a base user identification string from user 105. As described in more detail below, the UIS generation module 250 can use UIS generation logic and the base UIS to generate a unique account-specific UIS for each function linked (or a subset of the functions linked) to the user operation vehicle.

The account information received through account entry and verification module 640 is usually encrypted before it is transferred over network 115 to activation system 120, verification system 220, or UIS generation system 240. This encryption can be done using encryption/decryption module 650. In some embodiments, the encryption/decryption may be a soft encryption using software. In other embodiments, the encryption/decryption may be done using only hardware components or a combination of hardware and software components. In some embodiments, encryption/decryption module 650 can include one or more nCipher host security modules (HSM) (e.g., a cluster of nCipher HSMs). Examples of the types of encryption schemes that can be used include, but are not limited to, triple data encryption standard (DES3), advanced encryption standard (AED), Hypertext Transfer Protocol over Secure Socket Layer (https), secured socket layer (SSL), transport layer security (TLS), public/private key encryption, and others known to those of ordinary skill in the art.

Communications module 660 in some embodiments of the present invention is configured to manage and translate any requests from user 105, from a graphic interface screen, into a format required by the destination component and/or system. Similarly, communications module 660 may be used to communicate between systems and/or modules that use different communication protocols, data formats, or messaging routines. According to some embodiments, system components can communicate through one or more of the following messaging methods: ISO 8583 Standard for Financial Transaction Card Originated Messages, extensible markup language (XML), proprietary message formats, and/or others known to those of ordinary skill in the art.

Figure 7:
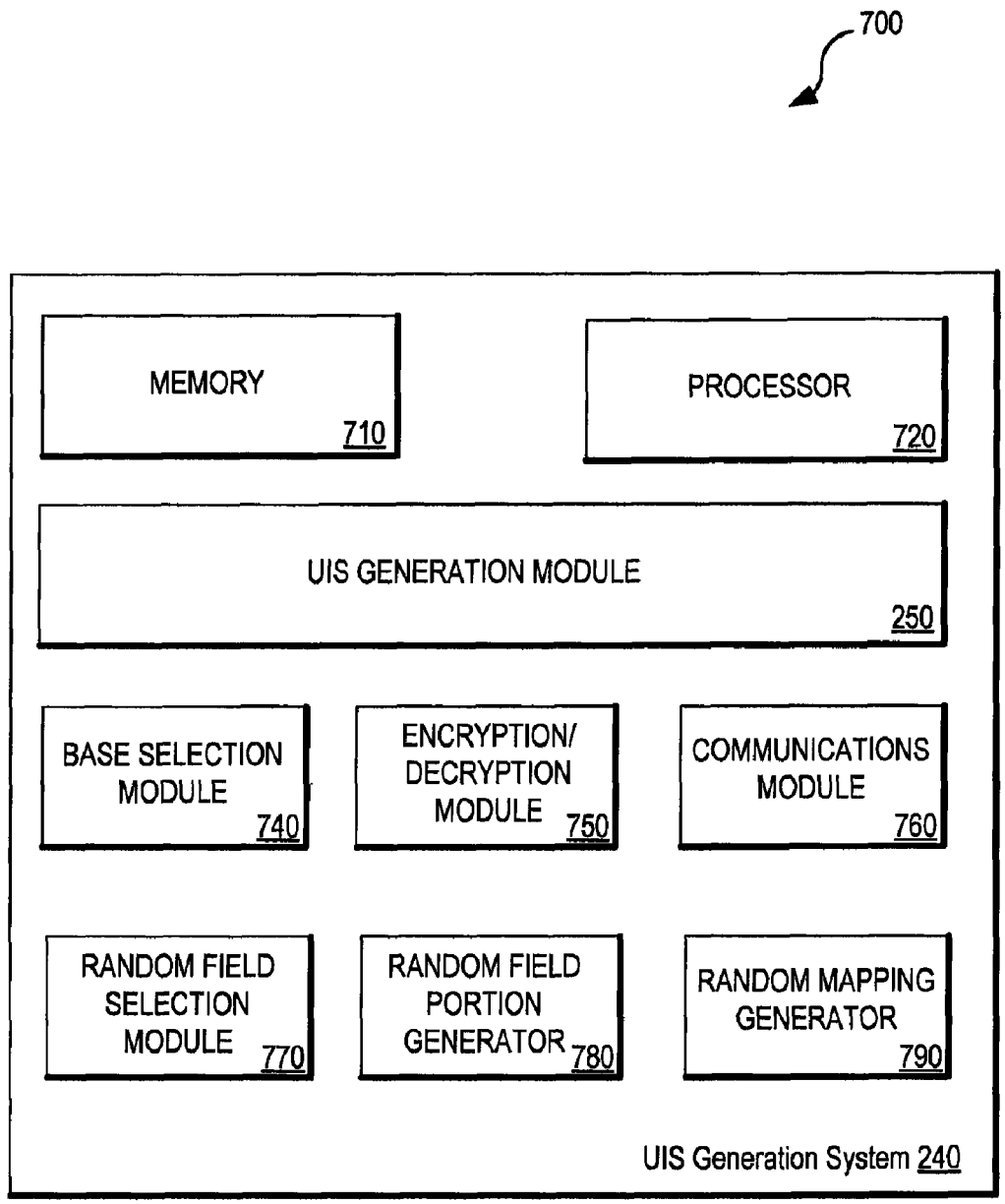
FIG. 7 is a block diagram illustrating components of a UIS generation system that may be used in accordance with some embodiments of the present invention.

FIG. 7 is a block diagram 700 illustrating components of a UIS generation system (UIS generator) 240 that may be used in accordance with some embodiments of the present invention. According to the embodiments shown in FIG. 7, UIS generation system 240 can include memory 710, processor 720, UIS generation module 250, base selection module 740, encryption/decryption module 750, communications module 760, random field selection module 770, random field portion generator 780, and random mapping generator 790. Other embodiments of the present invention may include some, all, or none of these modules and components along with other modules or application components. Still yet, some embodiments may incorporate two or more of these modules into a single module and/or associate a portion of the functionality of one or more of these modules with a different module. For example, in some embodiments, random field selection module 770, random field portion generator 780, and random mapping generator 790 may be combined into a single module. According to some embodiments, UIS generation system 240 is a component that includes hardware such as memory 710 and processor 720. However, in other embodiments, UIS generation system 240 refers to a software application that can be run on hardware such as a personal computer.

Memory 710 can be any device or mechanism used for storing information as described above with reference to memory 610. Memory 710 may be used to store instructions for running one or more applications or modules on processor 720. For example, memory 710 could be used in some embodiments to house all or some of the instructions needed to execute the functionality of UIS generation module 250, base selection module 740, encryption/decryption module 750, communications module 760, random field selection module 770, random field portion generator 780, and/or random mapping generator 790.

Base selection module 740, according to some embodiments of the present invention, could be used to select a set of digits (e.g., last four digits, first four digits, etc.) from one of the fields populated by the user through activation portal 110. In some embodiments, the field being randomly selected from the available fields by random field selection module 770. Once the field is selected, the random field portion generator selects which portion of the field will be used as the base UIS. For example, the last four digits, the first four digits, the third through sixth digit, etc. In other embodiments, the random field portion generator may select a set of letters, numbers, special characters, and/or a combination thereof as the portion to be used as the base UIs.

In some embodiments, encryption/decryption module 750 can encrypt and/or decrypt any messages sent or received by communication module 760 and between individual components of the UIS generation system. In some embodiments, the encryption/decryption may be a soft encryption using software. In other embodiments, the encryption/decryption may be done using only hardware components or a combination of hardware and software components. Examples of the types of encryption schemes include, but are not limited to, those listed for encryption/decryption module 650 in FIG. 6. Similar to communications module 660, communications module 760 may be used to communicate between systems and/or modules that use different communication protocols, data formats, or messaging routines.

As previously described, the activation portal SSO response sent from UIS generation system 240 can be generated with two extra data fields (e.g., RandomFieldSelected and SelectedDigits). In accordance with some embodiments, the mapping between the extra two data fields and the corresponding fields from which the information is gathered can be changed periodically to increase security. In some embodiments, random mapping generator 790 determines the mapping scheme currently being used. For example, the RandomFieldSelected=1 could be initially set to indicate the SSN number, 2 for the main zip code, 3 for ABA, 4 for DDA, etc. A new mapping can be generated by random mapping generator 790 and communicated to activation portal 110 using communications module 760.

Figure 8:
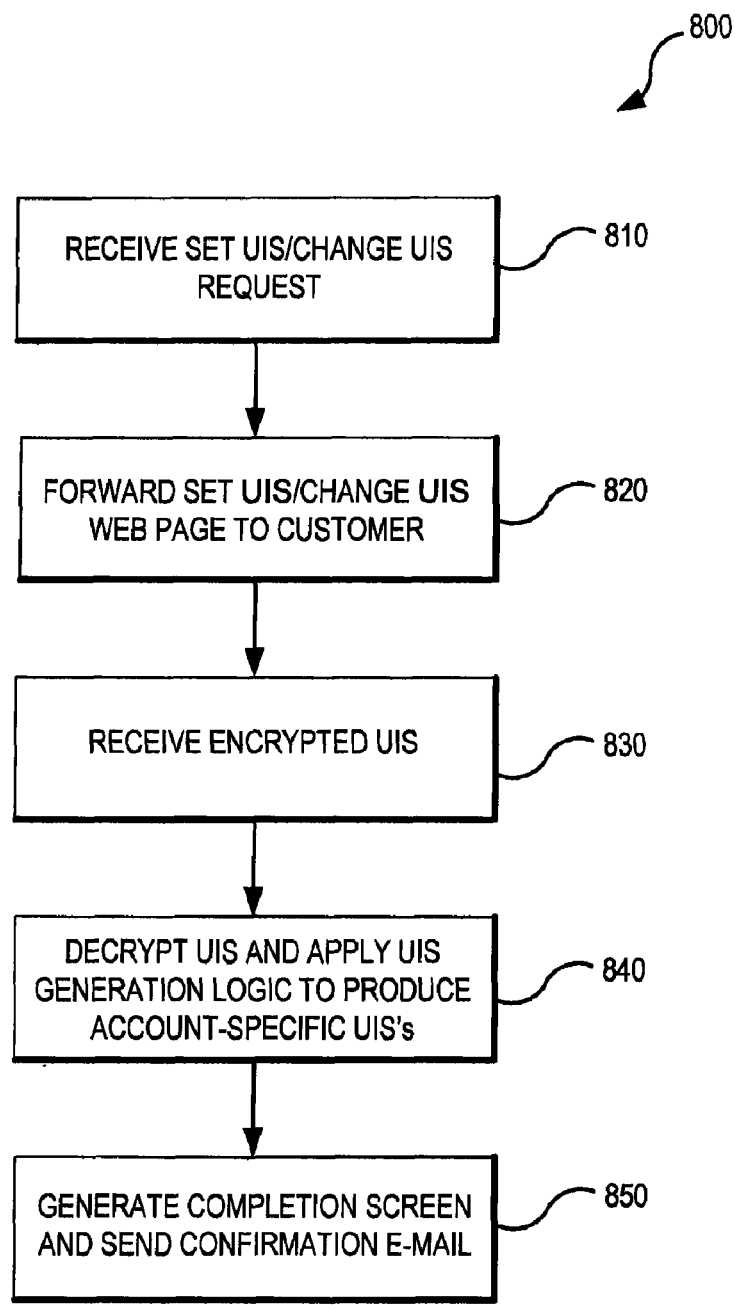
FIG. 8 is a flowchart illustrating an example of a method for operation of an activation portal in accordance with some embodiments of the present invention.

FIG. 8 is a flowchart illustrating one example of a method 800 for operation of activation portal 110 in accordance with some embodiments of the present invention. As indicated previously, activation portal 110 facilitates the exchange of information between activation system 120 and user 105 for the activation of a user operation vehicle. Referring to FIG. 8 in conjunction with FIG. 1, according to some embodiments of the present invention, activation system 120 can receive a set UIS request or a change UIS request through activation portal 110 during receiving operation 810. The request can come from a software program for changing or setting a UIS, a graphical user interface screen, a webpage, a telephone call with navigation through menus using the numerical keypad on the phone, a proprietary interface, and/or the like.

Once a request to set a UIS or change a UIS occurs during receiving operation 810, a response can be generated that is appropriate to the system through which the request originated. For example, if the request originated from a web page, a set/change UIS webpage can be generated and forwarded to the user 105 in forwarding operation 820. In this case, user 105 enters a base UIS on the set/change UIS webpage which is then encrypted and returned to activation system 120. Activation system 120 receives the encrypted UIS at receipt operation 830 and then decrypts the encrypted UIS during production operation 840. Once the base UIS is decrypted, some embodiments provide for UIS generation logic to be applied to the base UIS to generate an account-specific UIS for each account linked to the user operation vehicle. Each account-specific UIS is then encrypted and stored.

According to some embodiments that will be discussed below, various types of UIS generation logic can be used to create the account-specific UIS for each account linked to the user operation vehicle. Once an account-specific UIS is generated for each function, confirmation operation 850 can be used to generate a completion screen and/or send a confirmation e-mail or other type of message (e.g., letter, automated phone call, etc.).

Figure 9:
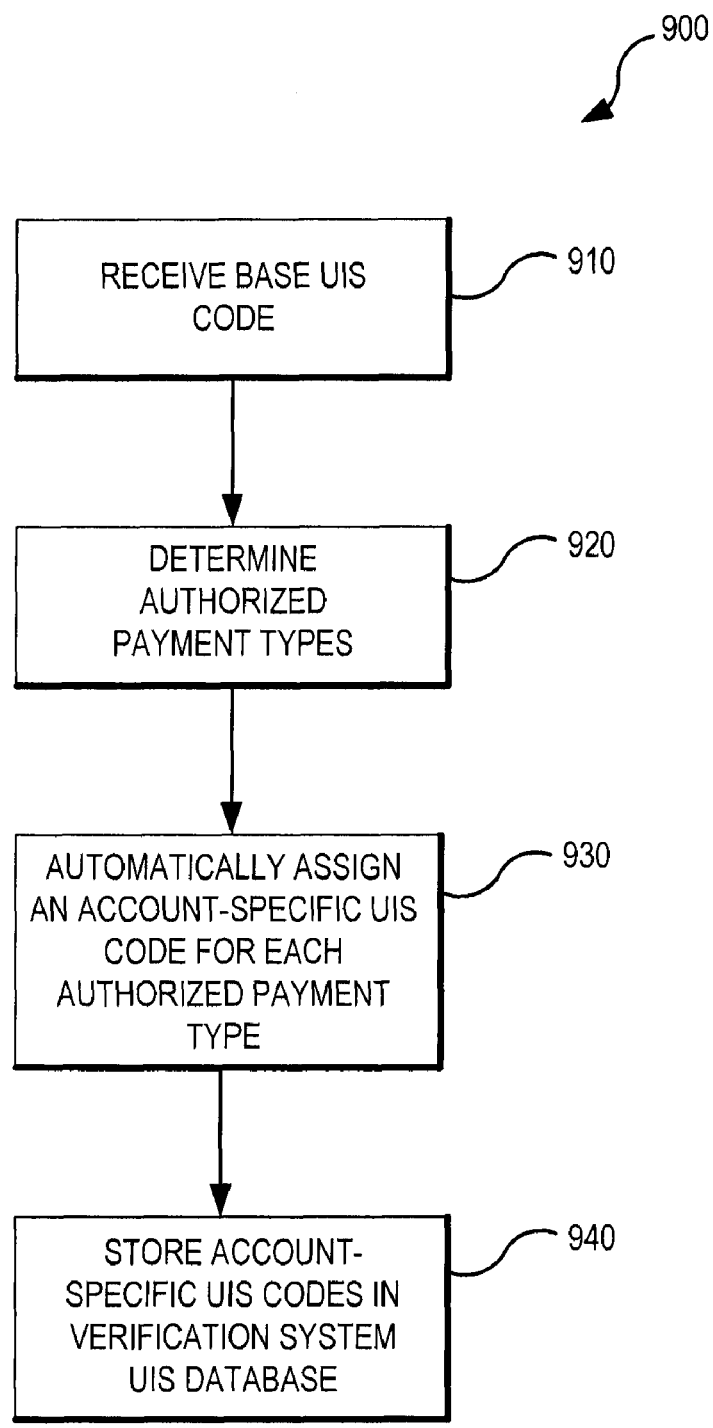
FIG. 9 is a flowchart illustrating an exemplary set of UIS generation logic for generating multiple user identification strings in accordance with some embodiments of the present invention.

FIG. 9 is a flowchart illustrating an exemplary set of UIS generation logic 900 for generating multiple user identification strings in accordance with some embodiments of the present invention. A base UIS is received at receipt operation 910. As previously discussed, the base, or original, UIS can originate from a user activating the user operation vehicle or requesting a UIS change. In the embodiments illustrated in FIG. 9, once the base UIS is received and processed, user determination operation 920 determines the authorized payment types (or functions) associated with the user operation vehicle.

For example, in accordance with some embodiments of the present invention, a user operation vehicle may be pre-associated with one or more payment functions before the user operation vehicle is offered to a user. One or more user operation vehicle type codes can be associated with the user operation vehicle offered to the user in some embodiments. The one or more type codes indicate pre-associated functions that can be linked to the user operation vehicle. For example, if there was a debit function, a credit function, and a prepaid function, there would be at most seven combinations of functions that are pre-associated and that can be linked (i.e., credit function, debit function, prepaid function, credit and debit function, credit and prepaid function, debit and prepaid function, and credit, debit and prepaid function). According to some embodiments, a type code can be associated with one or more of these options allowing a user to quickly link the desired combination of associated functions in a quick manner.

During the activation process, the user operation vehicle type code can be used to access (e.g., from a database) a list of the functions, corresponding to the user operation vehicle type code, that are to be linked to the user operation vehicle. In other embodiments, the user operation vehicle type codes may be used at a POI to activate a set of functions (or those functions associated with the code that are not yet activated). In some embodiments, a user may go to a store that is having a special promotion involving providing linking a new line of credit (or even a prepaid card) to the user operation vehicle subject to qualification of the user. The store can provide a promotion code that the user submits to associate and/or link the new payment function (e.g., store credit) that may not already be associated and/or linked to the user operation vehicle. In some embodiments, the promotion code can be entered during a purchase at the store. If the promotion code is accepted, the code may be processed immediately or stored for processing (e.g., credit approval, association, linking, etc.) in a batch mode at some later time or after the occurrence of some triggering event.

In some embodiments, the user is shown different accounts and doesn't activate all of them. The user can then be provided activation codes which the user can send to activate an account at a later time. According to some embodiments, these activation codes may be processed through a variety of systems including, but not limited to, telephone systems, internet accessed systems, through appending the activation code to a UIS at a POI device, interactions with a customer service representative, and others systems, methods, and means.

Using the base UIS and the determined authorized payment types, account-specific UIS generation operation 930 creates a unique account-specific UIS for each account associated with the user operation vehicle. According to some embodiments, the account-specific UIS can be generated by appending one more additional numbers, letters, special characters and/or the like to the end of a base UIS entered by the user for each account linked to the user operation vehicle. For example, to produce an account-specific UIS in one or more embodiments, the number one is appended to the end of the base UIS and associated with a debit function, the number two is appended to the end of the base UIS and associated with a credit function, the number three is appended to the end of the base UIS and associated with an accumulated value function, the number four is appended to the end of the base UIS and associated with a prepaid function, etc. The following table illustrates this idea where the user entered the original UIS once as 2254 and a credit account, a debit account, an accumulated value account, a prepaid account, and a rewards account are linked to the user operation vehicle:

| Function Types Linked to the User Operation Vehicle | Base UIS | Account-Specific UIS |
|---|---|---|
| Debit | 2254 | 22541 |
| Credit | 2254 | 22542 |
| Accumulated Value | 2254 | 22543 |
| Prepaid | 2254 | 22544 |
| Rewards | 2254 | 22545 |

From the four digit UIS that the user entered, five new five digit UIS's were created. In accordance with some embodiments, any set of different numbers (or even letters and/or special characters) may be appended at the end of the UIS to indicate these functions. For example, the letter "c" could be used for credit, the letter "d" could be used for debit, the letters "av" could be used for accumulated value, the letter "p" could be used for a prepaid function, and the letter "r" could be used for a reward function.

If there are more than one function type (e.g., two debit functions) to be associated with the user operation, one or more additional numbers could be appended after the payment type in some embodiments. The following table illustrates this idea where the user entered the original UIS once as 2254 and there are three credit functions, two debit functions, no accumulated value functions, one prepaid function, and one rewards function:

| Function Types Linked to the User Operation Vehicle | Base UIS | Account-Specific UIS |
|---|---|---|
| Debit 1 | 2254 | 225411 |
| Debit 2 | 2254 | 225412 |
| Credit 1 | 2254 | 225421 |
| Credit 2 | 2254 | 225422 |
| Credit 3 | 2254 | 225423 |
| Prepaid | 2254 | 225441 |
| Rewards | 2254 | 225451 |

From the four digit base UIS that the user entered, seven new six digit UIS's were created where the first four numbers are the base UIS, the fifth number corresponds to a payment type and the sixth number refers to the account within that payment type. Of course, any number, character, special character, or string thereof could be used to indicate payment type and account number. In accordance with some embodiments, any set of different numbers (or even letters and/or special characters) may be appended at the end of the base UIS to indicate these functions. For example, the characters "c1", "c2", and "c3" could be used for a first, second, and third credit, the characters "d1" and "d2" could be used for a first and second debit, the characters "p1" could be used for a first prepaid function, and the characters "r1" could be used for a first reward function.

Another example of the type of UIS generation logic that could be applied to generate account-specific UIS's for each function is adding or subtracting a value to the base UIS (i.e., incrementing the base UIS) entered by the user. As a simple example, the number one could be added to the base UIS and the result associated with a debit function, the number two could be added to the base UIS and the result associated with a credit function, the number three could be added to the original UIS and the result associated with an accumulated value function, etc. The following chart illustrates this idea:

| Function Types Linked to the User Operation Vehicle | Base UIS | Offset | Account-Specific UIS |
|---|---|---|---|
| Credit | 2254 | +1 | 2255 |
| Debit | 2254 | +2 | 2256 |
| Accumulated Value | 2254 | +3 | 2257 |
| Prepaid | 2254 | +4 | 2258 |
| Rewards | 2254 | +5 | 2259 |

In other cases, offsets could be used. For example, any set of numbers such as 100, 200, 300, etc. could be used for credit, debit, accumulated value, etc. Similarly, where the user operation vehicle has more than one of the same function, additional numbers could be added and/or subtracted. For example, an additional 10 for each account. The following table illustrates this idea where the user entered the base UIS once as 2254 and there are two credit functions, three debit functions, no accumulated value functions, one prepaid function, and one rewards function:

| Function Types Linked to the User Operation Vehicle | Base UIS | Function Offset | Account Number | Account-Specific UIS |
|---|---|---|---|---|
| Credit 1 | 2254 | 100 | 1 | 2355 |
| Credit 2 | 2254 | 100 | 2 | 2356 |
| Debit 1 | 2254 | 200 | 1 | 2455 |
| Debit 2 | 2254 | 200 | 2 | 2456 |
| Debit 3 | 2254 | 200 | 3 | 2457 |
| Prepaid | 2254 | 400 | 1 | 2655 |
| Rewards | 2254 | 500 | 1 | 2755 |

From the four digit base UIS that the user entered, seven new four digit UIS's were created from the one base UIS. Again, these examples are meant to be exemplary of the types of UIS generation logic that might be applied and are not meant to be limiting in any way. In fact, any operation (e.g., add, subtract, multiply, divide, etc.) or combination of operations that result in a unique account-specific UIS for each account associated with the user operation vehicle would work. In addition, the illustrations shown show a four digit numerical UIS being entered by the user and numerical account-specific UIS's. This is not the case in every embodiment and is only meant to illustrate various ideas and, in some embodiments, letters, numbers, special characters, and the like may be used for the base UIS and/or the additional characters used to generate the account-specific UIS.

In accordance with some embodiments, the user is able to select from a set of UIS generation logic options for the creation of the multiple account-specific UIS's that will be associated with the user's user operation vehicle. In addition, the users of some embodiments of the present invention are provided with an option to decide how the accounts of a similar type are ordered, how the function types are ordered, the offset associated with each function type, and/or other parameters in the creation of the multiple account-specific UIS.

In addition to credit, debit, prepaid, rewards, accumulated value and other payment functions with immediate processing, other different payment processing options can be linked to or used with the user operation vehicle in accordance with some embodiments of the present invention. For example, payment options or arrangements such as sixty days same as cash, ninety days same as cash, one-hundred eight days same as cash and the like may be available to be linked and/or used. Similarly, for debit functions, prepaid functions, reward functions, and other functions, the user payment options may include a delayed deduction meaning the payment will not be processed for a specified period of time (e.g., three days, seven days, thirty days, and the like). A determination can be made that the user is credit worthy for these options, but the options are not activated until a code is entered by the user at a POI. Some options may have expiration dates while others may not.

For example, suppose a user has been granted a sixty days same as cash offer and the user has the following UIS strings associated with the user operation vehicle:

| Function Types Linked to the User Operation Vehicle | Base UIS | Account-Specific UIS |
|---|---|---|
| Debit | 2254 | 22541 |
| Credit | 2254 | 22542 |
| Prepaid | 2254 | 22543 |
| Rewards | 2254 | 22544 |

When a user goes to a store to purchase merchandise and wants to pay using the sixty days same as cash offer, the user can enter the account-specific UIS choosing the payment function followed by a payment option code (e.g., "60" to indicate sixty days same as cash) which has been communicated to the user. To activate this payment option the user would enter the modified UIS as 2254260 to pay with credit using the sixty days same as cash option. These payment codes can be anything that indicates payment options. Some examples of payment option codes include, but are not limited to, "90" to indicate ninety days, "180" to indicate one-hundred eighty days, "s" to indicate sixty days, "n" to indicate ninety days, "o" to indicate one-hundred eighty days.

In some embodiments, the account-specific UIS's are stored in an encrypted system possibly managed by a third party. As a result, in some embodiments, there might not be a way of determining the base UIS after the card activation or change UIS events have occurred. In order to offer special promotions via UIS some embodiments set up additional UIS's when the customer selects their base UIS. In some cases, the number of additional UIS's set up are based on a set of promotions planned in advance. In some embodiments, as additional new promotions are planned beyond the scope of the original set of planned promotions, the user can be requested to change the UIS's associated with the user operation vehicle. One advantage of this approach is the enhanced security that is created by the user being encouraged to change their UIS's regularly in order to be able to take advantage of new promotions. In some embodiments, the system allows the customer to select their own UIS during card activation that can then be used for special offers, transactions, etc.

In some embodiments, the base UIS can be determined by decrypting an encrypted base UIS, if stored, or one or more of the account-specific UIS's. Then, promotion-specific UIS's can be created that are associated with one or more promotions. In some embodiments, the promotion-specific UIS's can be generated based on the automatic UIS generation system described above. For example, using the automatic UIS generation, a one time UIS can be created from the customer's data. Suppose a promotion to give a customer a percentage point bonus (e.g., ten percent), percentage discount, etc after a number (e.g., 10) of successfully processed transactions. A promotion-specific UIS could be generated from the customer's data (e.g., last four-digits of a phone) followed by the number 10. An email, SMS, outbound voice message from a voice response unit, letter, fact, etc could be sent to the customer to advise them that if they enter that promotion-specific UIS on a transaction of their choice, they'll get the bonus. In addition, the term account-specific UIS's can include promotion-specific UIS's in some embodiments of the present invention since the reward or reward actions can be viewed as the account balance.

Figure 10:
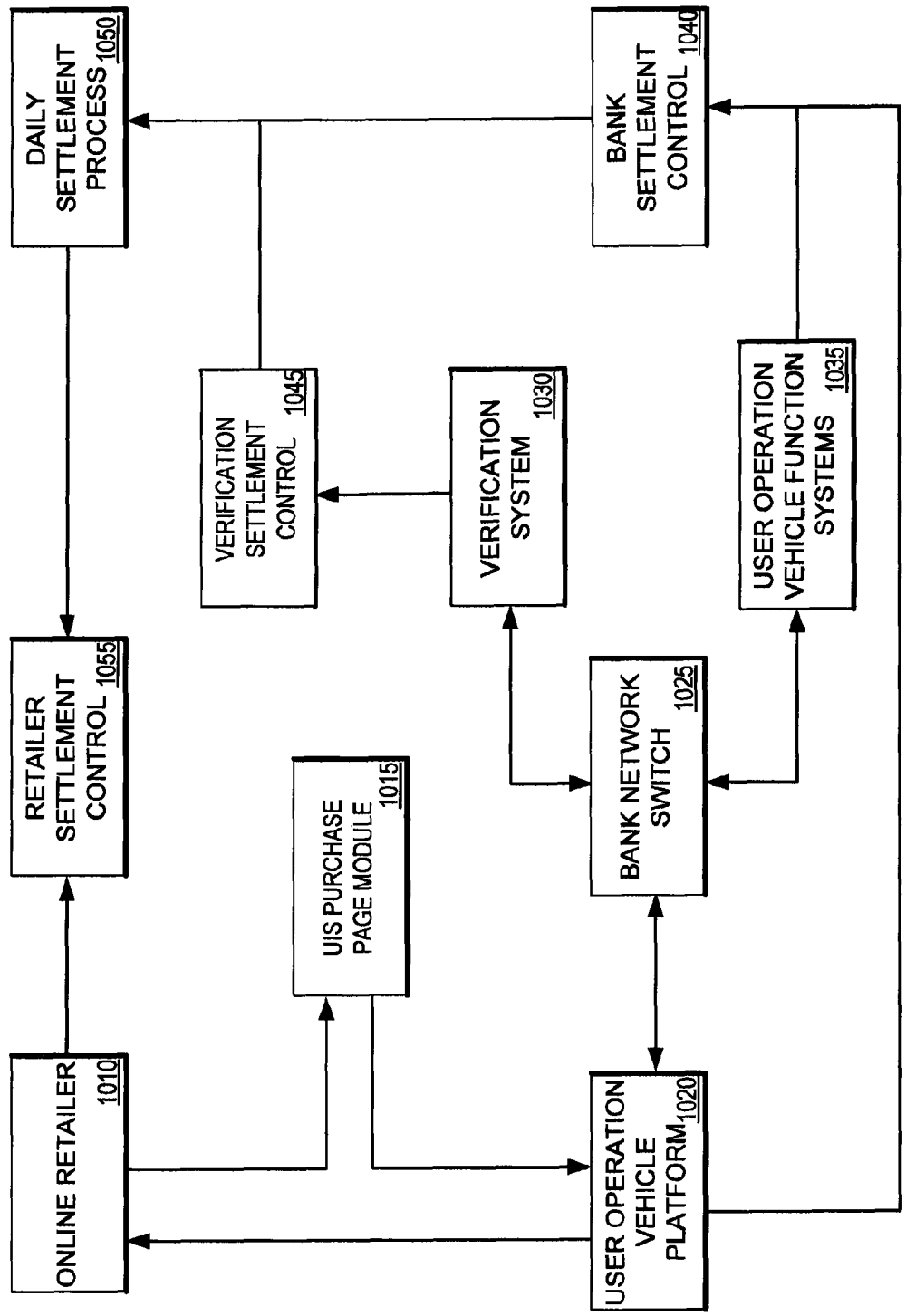
FIG. 10 illustrates an example of online transaction processing which may be used in some embodiments of the present invention.

FIG. 10 illustrates an example of online transaction processing (online authorization request processing) which may be used in some embodiments of the present invention. When a user makes a purchase through an online retailer or merchant 1010 a single sign on (SSO) message can be generated.

In some embodiments, the SSO message can include various types of information about the transaction or purchase including, for example, purchase amounts. Once generated, the SSO message can be passed to UIS purchase page module 1015. Module 1015 generates a UIS purchase page that can be displayed through a webpage to the customer making a purchase from online retailer 1010. The UIS purchase page in some embodiments of the present invention can include a section for the customer to enter user operation vehicle identification information along with a UIS. The customer can then enter the UIS corresponding to the payment function the customer desires to use to complete the purchase.

The purchase details (e.g., purchase amount, user operation vehicle identification information, etc.) and the UIS entered by the customer can then be sent to the user operation vehicle platform 1020. In accordance with some embodiments, user operation vehicle platform 1020 validates the purchase details and the user operation vehicle information. If the details and information are not corrupted, a user operation vehicle purchase transaction request can be generated by user operation vehicle platform 1020. In some embodiments, the user operation vehicle transaction request is transferred to bank network switch 1025 over a communications network, leased line, dedicated communications channel, or the like.

Once the user operation vehicle transaction request is received, bank network switch 1025 routes the transaction to verification system 1030 over a communications network, leased line, dedicated communications channel, or the like. Verification system 1030 can then validate the UIS entered by the customer, determine the function associated with the UIS (e.g., debit, credit, accumulated value, etc.), and generate a function payment authorization request. Once generated, the function payment authorization request can be transferred to bank network switch 1025.

In accordance with various embodiments, bank network switch 1025 can determine which function is authorized to be charged. In some embodiments, the determination is made based on the message format and/or message content. Once a determination is made, the function payment authorization request can be routed to the corresponding user operation vehicle function system 1035 that can include one or more function processing systems (e.g., credit processing system, debit processing system, etc.). The selected function processing system processes the request and returns an authorization response back to bank network switch 1025.

In some embodiments, the authorization response can be routed from bank network switch 1025 to verification 1030, where the response is processed and then returned to bank network switch 1025. From the bank network switch, the authorization response is routed to user operation vehicle platform 1020 which generates and returns an approval or denial message back to online retailer 1010.

According to some embodiments, a daily settlement process 1050 occurs between online retailer 1010, user operation vehicle function systems 1035 (e.g., accumulated value processing system, debit processing system, credit processing system, etc.), and verification system 1030. In some embodiments, daily settlement files are generated based on the payments processed. Some embodiments use bank settlement control module 1040, verification settlement control module 1045, and retailer settlement control module 1055 to generate daily settlement files which are processed through daily settlement process 1050 between the online retailer and function account holders. While not illustrated in FIG. 10, in some embodiments, daily settlement process 1050 is routed to the retailer settlement control module 1055 through bank switch 1025.

Figure 11:
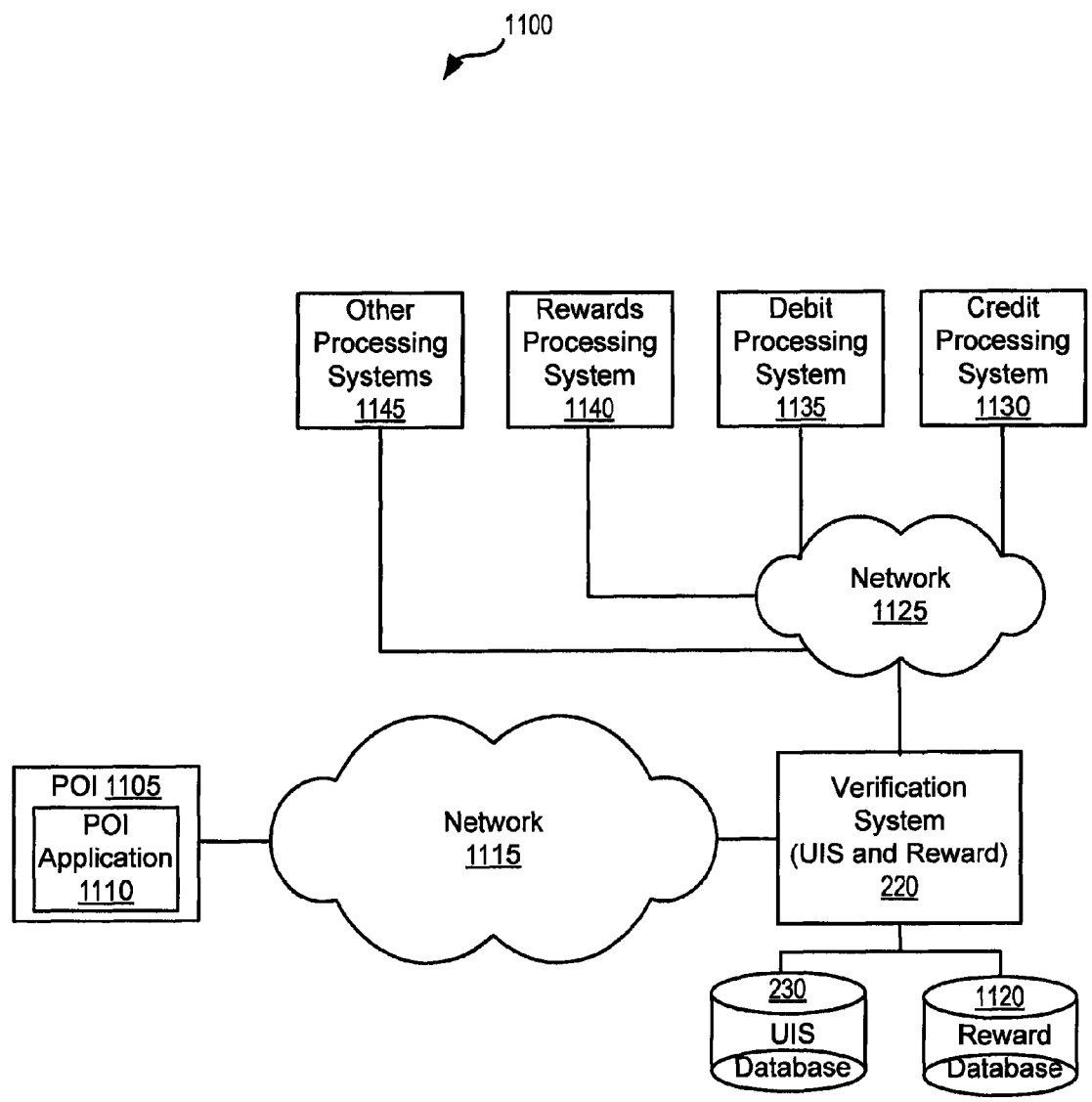
FIG. 11 illustrates an example of an operating environment in which some embodiments of the present invention may be utilized.

FIG. 11 illustrates an example of an operating environment 1100 in which some embodiments of the present invention may be utilized. In the embodiments illustrated in FIG. 11, a user can make a purchase at POI device 1105 after activating the user operation vehicle. According to some embodiments, using one of the generated account-specific UIS's, the user can select which payment function will be used to process the transaction. In addition, some embodiments of the present invention provide for the addition of functionality (e.g., rewards, rounding sweep, etc.) to the UIS for use at a POI device 1105.

FIG. 11 includes various components including a POI device 1105, POI application 1110, network 1115, UIS and reward verification system 220, UIS database 230, rewards database 1120, network 1125, credit processing system 1130, debit processing system 1135, rewards processing system 1140, and other processing systems represented by 1145. Examples of other processing systems include, but are not limited to, store value processing systems, gift card processing systems, consumer to consumer payment systems, proprietary payment systems, as well as others.

According to some embodiments, a user can append additional characters to the end of the UIS at POI device 1105. In some embodiments, POI device 1105 can be a point of sale device, or comprised of components and/or software, purchased from Advanced Retail Management Systems, Microsoft dynamics RMS, Retail Pro, CounterPoint or other vendors.

By appending additional characters to the end of the UIS, the user creates a modified UIS (MUIS). However, according to some embodiments of the present invention, POI device 1105 treats a MUIS and a UIS in the same manner. POI device 705 processes all of the information received (e.g., the user operation vehicle account number, modified UIS, transaction information, merchant information, and possibly other information) and generates a total string of characters. The total string of characters can include various pieces of information such as, but not limited to, a primary account string, a user identification string (UIS), a function selector, a reward code, a modified UIS, merchant code, and/or the like.

The string of characters is typically partially encrypted by an encryption/decryption module associated with the POI, although in some embodiments it may be entirely encrypted or not encrypted at all. For example, in some embodiments, the UIS (or MUIS) would be encrypted, the account number would not be encrypted, and other pieces may or may not be encrypted depending on the technology, administrator preferences, and/or protocols set in place. The string of characters is then transmitted across network 1115 to verification system 220 in accordance with various embodiments of the present invention. Then, the string of characters can be parsed into the various tokens (e.g., the primary account string, the UIS, the function selector, and/or the reward code) using parsing logic.

In some embodiments of the present invention, the user and/or reward code can be validated using one or more of the various tokens. For example, the validation can occur by comparing a user operation vehicle UIS stored in UIS database 230 that is associated with the primary account number with the UIS received in the string of characters. Similarly, a determination of a reward action associated with the reward code can be made. The determination of the reward action can occur in a number of different ways according to various embodiments of the present invention. For example, in some embodiments, the reward determination can be performed by looking up the reward code in reward code database 1120. As another example, the reward determination can be performed by deciphering the reward code into various tokens that correspond to various reward elements.

Once the reward code is determined and applied, a payment request can then be sent for processing. In some embodiments, the payment processing occurs through a function indicated by a function selector. For example, the function selector can indicate that payment processing occur through a credit processing system 1130, a debit processing system 1135, a rewards processing system 1140, other processing systems 1145 (e.g., store value, gift card, consumer to consumer, prepaid, etc.), and/or the like.

In some embodiments, the user can select a rounding sweep option that will result in a set of UIS's being generated that will result in a rounding sweep for a particular account. In some embodiments, however, no additional UIS's are generated, but a user code is supplied to the user allowing the user to create a MUIS at the merchant that will result in the rounding sweep. In accordance with some embodiments, the amounts set for the rounding sweep can be one dollar, five dollars, and ten dollars. In some embodiments, the corresponding user code can be the numbers one, five, and ten. However, in other embodiments, different user codes and amounts may be used, and more or less rounding options may be available. In accordance with some embodiments, the account specified by the user for the rounding sweep deposit could be a savings account, or any other account, from any bank, merchant, etc. As a result of the rounding sweep in some embodiments a decoupled savings or independent savings is created.

As such, the user can select, at a POI, an account-specific UIS for debit (e.g., 3345) would result in an ACH debit of that amount. For example, when the user makes a $33.37 purchase through a POI and uses the account-specific UIS for debit, a corresponding $33.37 ACH debit would be generated. In some embodiments, an MUIS corresponding to the account-specific UIS for debit followed by the number one (e.g., 33451) would result in a round up to the nearest dollar and the difference between the transaction amount at the merchant and the rounded amount being deposited in a specified account. So, for example, a $33.37 purchase through a POI using the MUIS of account-specific UIS for debit followed by the number one (e.g., 33451) would result in a $34.00 ACH Debit and $0.63 would be deposited into the accumulated value account, a savings account, etc. that was specified by the user.

In some embodiments, an MUIS corresponding to the account-specific UIS for debit followed by the number five (e.g., 33455) would result in a round up to the nearest five dollars. So, a $33.37 purchase using the MUIS of account-specific UIS for debit followed by the number five (e.g., 33455) would result in a $35.00 ACH Debit and $1.63 would be placed in an accumulated value account, a savings account, etc. that was specified by the user. In some embodiments, an MUIS corresponding to the account-specific UIS for debit followed by the number ten for debit followed by the number five (e.g., 334510) would result in a round up to the nearest ten dollars. So, a $33.37 purchase using the MUIS of account-specific UIS followed by the number five (e.g., 334510) would result in a $40.00 ACH debit and $6.63 would be placed in an accumulated value account, a savings account, or other account that was specified by the user.

In some embodiments, part of the MUIS contains an identifier identifying the system for processing and possibly a delayed payment option. For example, a user may enter a MUIS as "987613." In some embodiments, the first four characters are the user identification string, the fifth character is the processing identifier, and the sixth character as the payment option. In this example, the system will recognize that "9876" is the user identification string. The system will also identify "1" as an identifier identifying, e.g., the debit processing system. In some embodiments, the payment option "3" means that the funds will be processed three days later. If the customer is not eligible for the delayed payment option, or if the token is not valid or unrecognized, the system can ignore the token and continue to process the transaction or, in some embodiments, decline the transaction. The delayed payment option can be set up to be anything. For example, the delayed payment option token can correspond to equal monthly installment payments (e.g., "5" means five equal monthly installments), delayed payments (e.g., "4" means a four day delay before processing), as well as others. According to some embodiments, the delayed payments may be processed in a batch processing mode discussed in more detail below with regard to FIG. 15.

In the embodiments illustrated in FIG. 11, the processing systems 1130-1145 are different entities and may be located at different physical locations or use unique routing information. In some embodiments, however, the processing systems are part of a centralized system which includes one or more payment processing subsystems for processing credit, debit, rewards, prepaid, consumer to consumer payments, and the like. As such, when the payment is received at the centralized system, a determination is made as to how the payment should be processed.

In some embodiments, the processing systems 1130-1145 are in communication with one another (e.g., through network 1125, through a dedicated communications channel, etc.). Accordingly, this allows the processing systems to interact in the application of rewards, in facilitating the splitting of payment across one or more payment functions, and/or the like.

Figure 12:
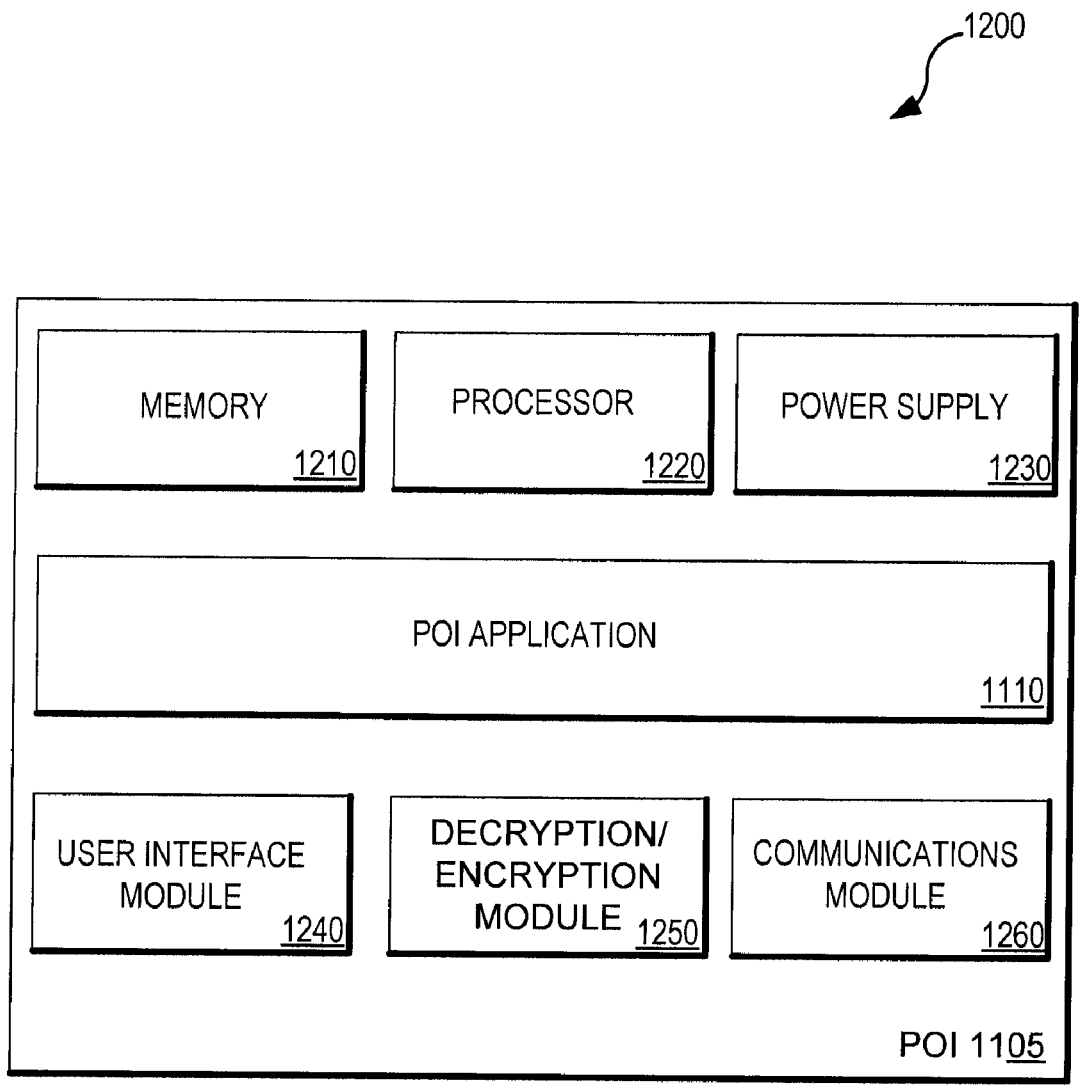
FIG. 12 is a block diagram illustrating components of a point of interaction device that may be used in accordance with some embodiments of the present invention.

FIG. 12 is a block diagram illustrating components of a POI device 1205 that may be used in accordance with some embodiments of the present invention. POI device 1205 can be a standard POI device currently in use today, or a new device with increased functionality. According to the embodiments shown in FIG. 12, POI device 1105 includes memory 1210, processor 1220, power supply 1230, POI application 1110, user interface module 1240, encryption/decryption module 1250, and communications module 1260. Other embodiments of the present invention may include some, all, or none of these modules and components along with other modules and/or application components. Still yet, some embodiments may incorporate two or more of these modules into a single module and/or associate a portion of the functionality of one or more of these modules with a different module. For example, in some embodiments, user interface module 1240 can be combined with POI application 1110.

Memory 1210 can be any device or mechanism used for storing information. In accordance with some embodiments of the present invention, memory 1210 is intended to encompass any type of, but is not limited to, volatile memory, nonvolatile memory and dynamic memory. For example, memory 1210 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 1210 may include one or more disk drives, flash drives, databases, local cache memories, processor cache memories, relational databases, flat databases, and/or the like. In addition, those of ordinary skill in the art will appreciate many additional devices and techniques for storing information can be used as memory 1210.

In some embodiments, memory 1210 can be used to store instructions for running one or more applications or modules on processor 1220. For example, memory 1210 could be used to house all or some of the instructions needed to execute the functionality of POI application 1110, user interface module 1240, and/or communications module 1260.

Some embodiments of POI device 1105 include power supply 1230 which can be any type of device that supplies the necessary power required by POI device 1105. For example, power supply 1230 may be an independent rechargeable battery, multiple batteries, and/or other external power supplies. The power supply may be internal or external to POI device 1105. For example, external power may be supplied by accessing a power generator, solar grid, power line, and/or the like.

POI application 1110 can, in accordance with some embodiments, offer additional intelligence to POI device 1105. For example, POI application 1110 can include intelligence systems such as real-time inventory information. In some embodiments, part of the reward verification system in verification system 220 may be accessed through POI application 1110. For example, each store could create a reward system through which additional strings of numbers appended to the beginning, end, or within the UIS could be validated and applied to the transaction.

User interface module 1240 includes any hardware and software components for interaction with a user. For example, in some embodiments, user interface module 1240 is a numerical keypad with software running on processor 1220 which monitors for entry of UIS. Decryption/encryption module 1250 is used to encrypt any information that has to be transferred across network 1115 and decrypt any incoming messages that are encrypted. Communications module 1260 in some embodiments of the present invention is configured to translate any messages from POI device 1105 into a format required by the destination component and/or system. For example, communication protocols for peripheral devices and/or computers include, but are not limited to, ADM 787/788, AEDEX, CD 5220, DSP-800, EPSON Esc/POS, UPOS, industry standard PoS protocols, proprietary protocols and the like. Similarly, communications module 1260 can route encrypted messages to decryption module 1250 and can request encryption module 1250 encrypt outgoing messages.

Figure 13:
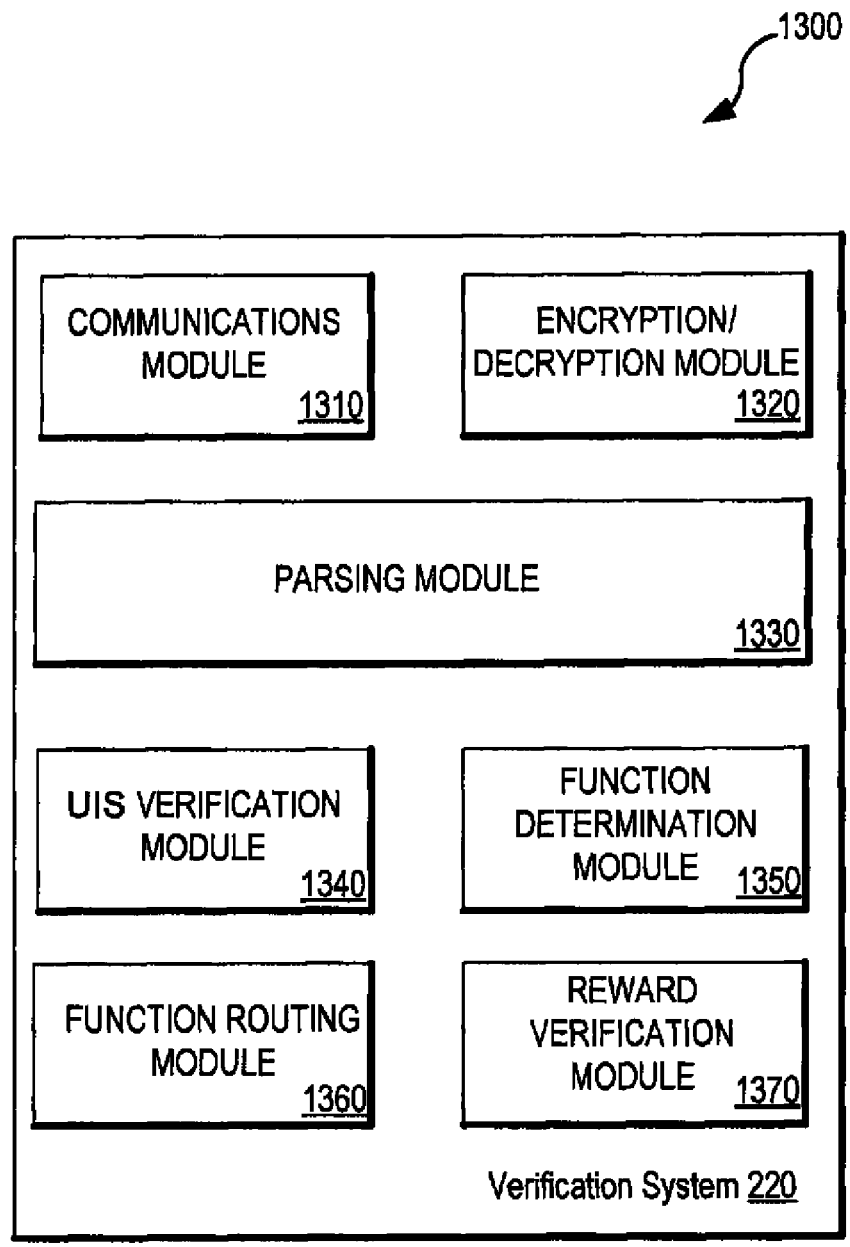
FIG. 13 is a block diagram illustrating components of a verification system that may be used in accordance with some embodiments of the present invention.

FIG. 13 is a block diagram illustrating components of a verification system 1300 that may be used in accordance with some embodiments of the present invention. According to the embodiments shown in FIG. 13, verification system 220 can include communications module 1310, encryption/decryption module 1320, parsing module 1330, UIS verification module 1340, function determination module 1350, function routing module (switch) 1360, and reward verification module 1370. Other embodiments of the present invention may include some, all, or none of these modules along with other modules and/or application components. Still yet, some embodiments may incorporate two or more of these modules into a single module and/or associate a portion of the functionality of one or more of these modules with a different module.

According to some embodiments of the present invention, an authorization request (or a transaction request) is received at verification system 220 from a POI device. All requests may be received through communications module 1310 which is able to receive all incoming requests and/or messages, and direct the requests and/or messages to the correct module for processing.

In some embodiments, an incoming authorization request may be encrypted. When such a request is received at communications module 1310, the request is routed to encryption/decryption module 1320 if the request is encrypted. Encryption/decryption module 1320 decrypts the request. Also, in some embodiments, communication module 1310 sends the payment request to a function processing system to determine an approval or denial of a transaction if the UIS verification module 1340 determines the UIS corresponds to the primary account UIS. Similarly, communication module 1310 can send the reward code to a rewards processing system, in some embodiments, where a determination of the type and amount of reward associated with the reward code.

In accordance with some embodiments, the incoming authorization or transaction request includes an encrypted string of characters. The authorization request can also include various types of information such as a payment request amount, a primary account string, a user identification string (UIS), transmission time and date, payment device expiration date, processing code, and/or the like. The string of encrypted characters can include a function selector, a reward code and other tokens. The authorization request can be parsed using parsing module 1330 in embodiments of verification system 220. For example, parsing module 1330 can use parsing logic to turn the authorization request into various tokens such as primary account string, the MUIS, the UIS, the function selector, the reward code and/or the like that are contained within the string of characters.

The UIS entered by the user, in some embodiments of the present invention, allows for the user to enter a reward code with the UIS thus generating a modified UIS (MUIS). In some cases, traditional parsing logic is used to extract, in part, the MUIS not knowing that it contains special reward code information. The MUIS can then be passed through an additional set of parsing logic where the UIS and the reward code are separated. In some embodiments, parsing the reward code and UIS is not necessary. For example, the MUIS can be directly compared to a preset UIS that includes the UIS and reward code stored in a UIS database. In some embodiments, the UIS database is encrypted.

UIS verification module 1340 validates a user, in some embodiments, by comparing a primary account UIS stored in a UIS database and associated with the primary account string with the UIS received in the encrypted string of characters. If the UIS stored in the UIS database does not match the UIS received, then the transaction is denied. If there is a match, then function determination module 1350 can be used to determine the desired function if a function indicator is present in the string of characters. If a function indicator is not present, then a set of pre-determined rules (e.g., associated with the individual user operation vehicle or a default across all user operation vehicles) could be followed for processing the transaction request. In some embodiments, the UIS is the function indicator with a unique UIS associated with each payment function linked to the user operation vehicle. Using either the determined function, UIS, or the pre-determined processing rules, function routing module 1360 routes the transaction to the appropriate payment processing system.

In some embodiments, when a reward code is present in the string of characters, reward verification module 1370 determines if the reward code is valid and what action is associated with the reward code. For example, the action could apply a certain percentage discount (e.g., ten percent off), give a certain amount off (e.g., five dollars off), free shipping, generate a reward credit, and the like. In some embodiments, determining the action associated with the reward code includes transmitting the reward code to a reward code verification module (reward code verifier) that is external to verification system 220 (e.g., the module is managed by a particular store or bank). The external reward code verification module determines the amount and value, if any, of the benefit and what action should be taken. This action is then transferred back to verification system 220, in some embodiments, and the benefit is applied.

Once the action or benefit is implemented, the transaction can be processed through the appropriate payment processing system. In some embodiments, the payment processing system includes a transaction type authorizer which can approve or decline the authorization request.

Figure 14:
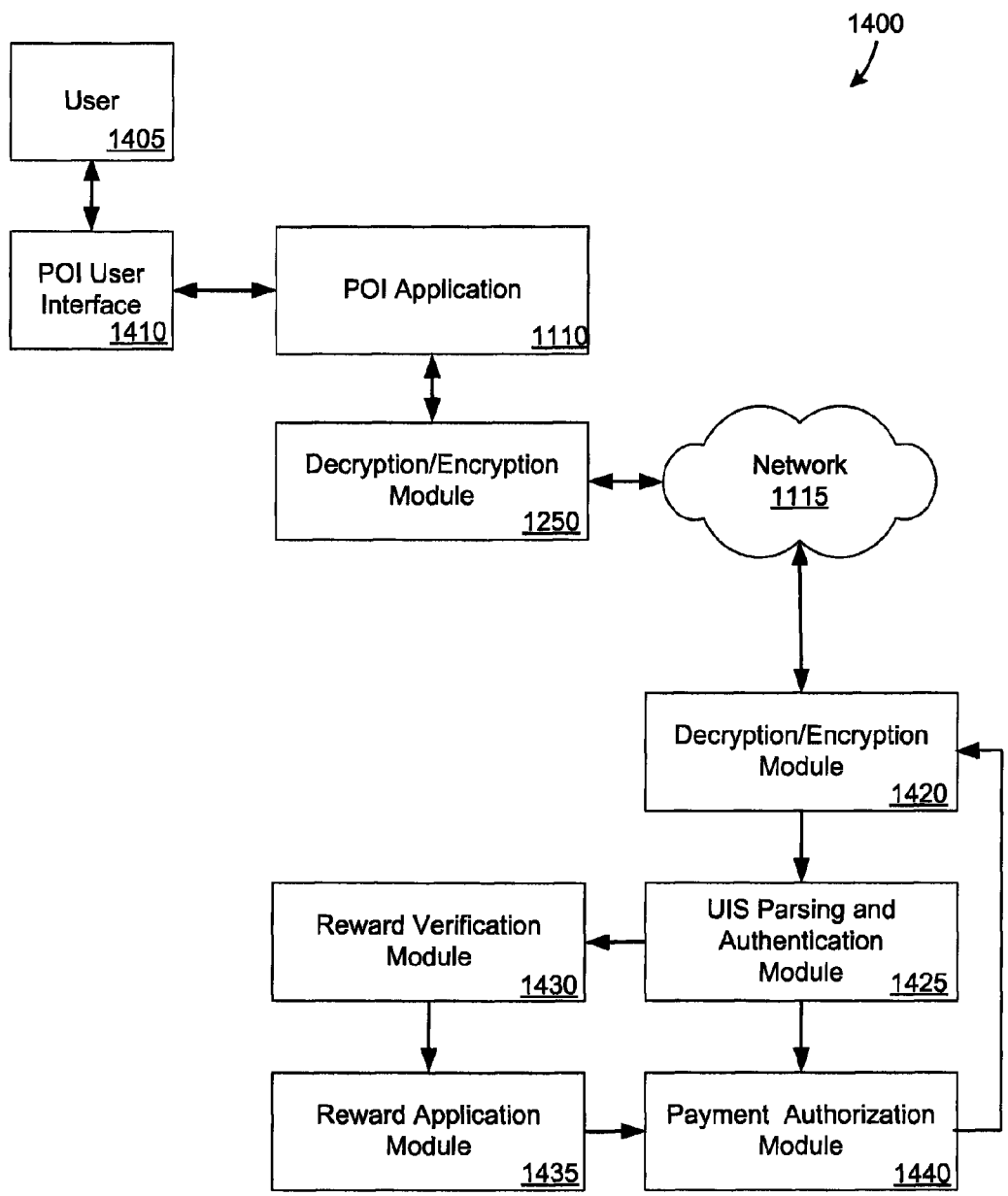
FIG. 14 is a block diagram illustrating various components that may be a part of a real-time payment processing network in accordance with some embodiments of the present invention.

FIG. 14 is a block diagram illustrating various components that may be a part of a real-time payment processing network 1400 in accordance with some embodiments of the present invention. Embodiments of the real-time payment processing network 1400 use various methods for processing a reward code which is presented by the user. The reward code may be presented in conjunction with a user's UIS (e.g., in a MUIS) to add functionality to the UIS when the user purchases goods or services at a POI. According to some embodiments, the user operation vehicle (e.g., card) can be associated with one or more accrued value or payment accounts (e.g., prepaid, debit, credit, etc.) and is presented at a POI user interface 1410 by user 1405.

The user's primary account number is received at a POI device through POI user interface 1410 in some embodiments of the present invention. For example, depending on the type of user operation vehicle being used, POI user interface 1410 can be a card reader, a magnetic strip reader, a fingerprint reader, manual entry key pad, a computer keyboard, voice recognition software, any biometric identifying device, and/or the like. A primary account number could be read directly from the user operation vehicle (e.g., when reading a card) or retrieved from a database. In some cases, a primary account number could be generated through unique characteristics of the user operation vehicle (e.g., applying a processing algorithm to a fingerprint). According to some embodiments, the primary account number can be associated with a single account or with one or more accrued value, reward, prepaid, credit, debit, and/or other payment accounts.

POI user interface 1410, in some embodiments, is in communication with a POI application 1110 which can be used for managing one or more peripheral devices such as a touch screen for order entry, printers, electronic cash registers, and/or the like. In some embodiments, POI application 1110 is a software application running on a computer through the Internet.

User 1405 can be prompted to enter a UIS that can be used to verify the identity of the user and/or select a payment function if the user operation vehicle is a multi-function user operation vehicle. User 1405 enters a UIS along with additional reward numbers. Once the primary account, UIS, and additional reward numbers are received along with any other information required by POI application 1110, POI application 1110 sends the primary account number, UIS, and reward numbers to decryption/encryption module 1250 where the information is encrypted to generate an encrypted input string of numbers before being transferred over network 1115 to a transaction processing system (an authorization request processing network). This information is typically partially encrypted, although in some embodiments it may be entirely encrypted. For example, in some embodiments, the UIS (or MUIS) would be encrypted, the account number would not be encrypted, and other pieces may or may not be encrypted depending on the technology, administrator preferences, and/or protocols set in place.

The encrypted input string of numbers from the POI device is received and then decrypted using decryption/encryption module 1420. In the embodiments illustrated in FIG. 14, after the string of numbers is decrypted (e.g., by decryptor 1420) the result is communicated to UIS parsing and authentication module 1425. Module 1425 parses the decrypted input string into the various tokens and verifies user 1405 is authorized to use the user operation vehicle by verifying the UIS provided corresponds with the primary account number. A determination is made as to whether input string contains reward numbers using reward determination logic.

If a determination is made that reward numbers or code exist in the input string, the reward numbers are passed to reward verification module (reward verifier) 1430. Module 1430 uses the information provided by UIS parsing and authentication module 1425 to determine the reward and/or action associated with the reward numbers in the input string. Reward application module 1435, in accordance with some embodiments, is configured to apply the reward, or take the reward action. For example, if the reward was an immediate ten percent discount, then the discount would be applied immediately to the transaction.

Once the application of the reward is complete, payment authorization module (function deduction authorizer) 1440 determines the appropriate payment processing network, transmits a request for payment to the determined payment processing network, and receives a payment authorization response (e.g., authorization, denial, partial denial indicating the amount that would be allowed, etc.). Determining the appropriate payment processing network can occur in a variety of ways depending on the embodiments in use. For example, in some embodiments, a function selector, that was included in the string of numbers, can be supplied to payment authorization module 1440 by UIS parsing and authentication module 1425. As another example, a unique UIS can be supplied to payment authorization module 1440 by UIS parsing and authentication module 1425. The unique UIS can then be used to determine which function associated with the primary account should be charged. In other embodiments, the primary account number includes routing information for payment processing that can be used by payment authorization module 1440 for routing the payment request. When the request to fund the transaction is approved or denied, the result is passed to the POI device.

Figure 15:
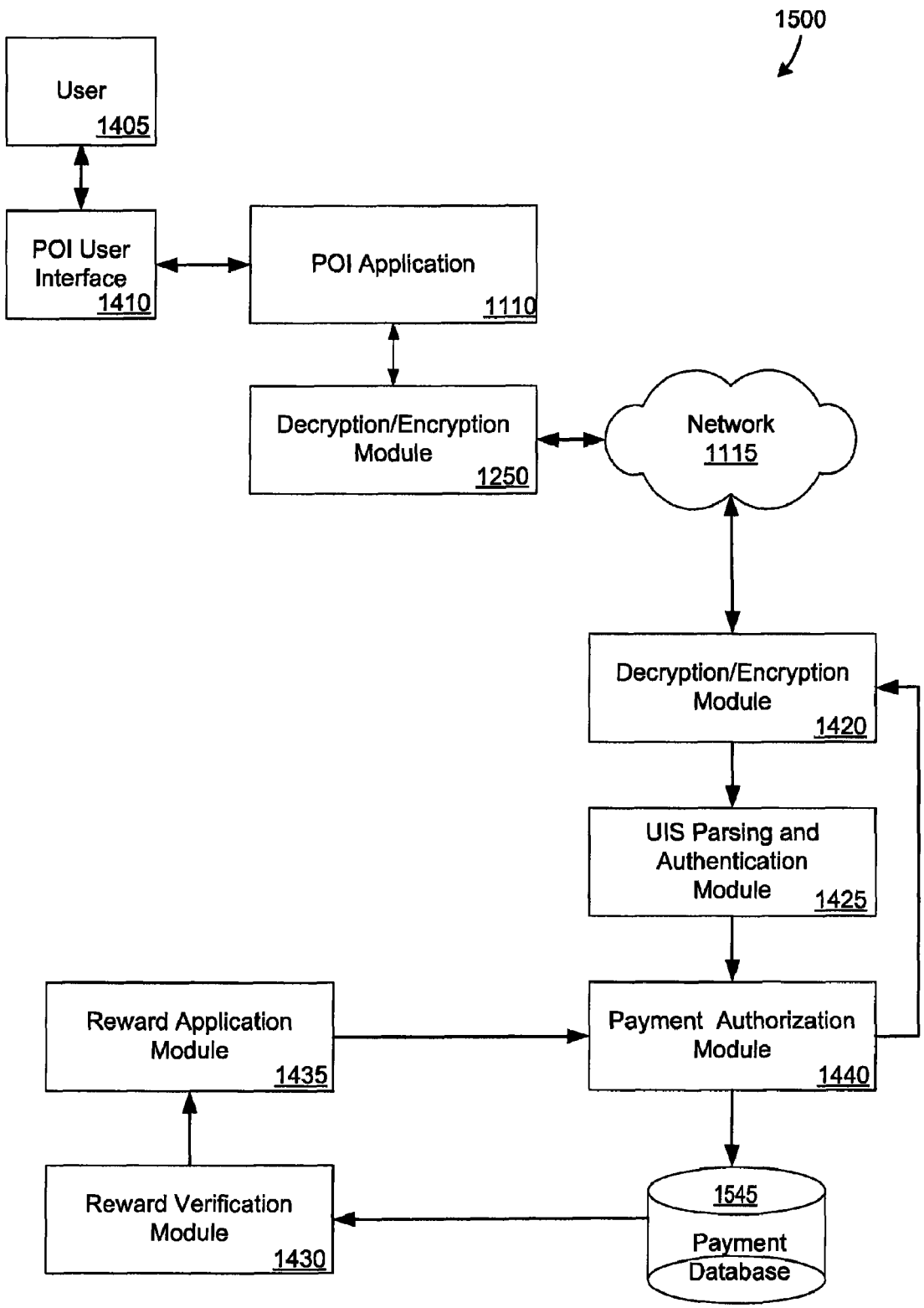
FIG. 15 is a block diagram illustrating various components that may be a part of a batch payment processing network in accordance with some embodiments of the present invention.

FIG. 15 is a block diagram illustrating various components that may be a part of a batch payment processing network 1500 in accordance with some embodiments of the present invention. According to the embodiments illustrated in FIG. 15, batch processing of payment requests occur in much the same way as real-time payment processing requests up until payment authorization module 1440. At payment authorization module 1440, various pieces of transaction information are received from the UIS parsing and authentication module 1425. Examples of the transaction information include, but are not limited to, the primary account number, UIS, reward code, function selection, payment request amount, merchant information, and/or the like.

As discussed above, some embodiments of the present invention include a delayed payment option that allows a customer who wants to process the transaction today but have the funds withdrawn from available accounts a few days later, set up recurring payments, have installment payments, and/or the like. Batch payment processing network 1500 describes some ways these transactions can be processed in accordance with various embodiments of the present invention.

Unlike the real-time payment processing network 1400, some piece of the transactional information (e.g., the application of the reward code) is not processed immediately but is stored in payment database 1545. According to various embodiments, the information could be sorted and stored based on one or more features of the requested transactions. Examples of features of the requested transactions include, but are not limited to, payment type, reward code present, merchant, authorizing financial institution, payment amount, and the like. Then, when a triggering event occurs, reward verification module 1430 pulls the information from payment database 1545 and determines if a reward code is present and what reward action, if any, should be taken. Examples of triggering events include, but are not limited to, timed intervals (e.g., every 5 seconds, every two minutes, every fifteenth day of the month, every two weeks, etc.), request from authorizing institutions, request from a specific payment network (e.g., credit network), a specified number of requests have been stored, and/or the like. The reward information can then be passed onto reward application module 1435 where the reward action is applied and the transaction requests are passed onto payment authorization module 1440.

Figure 16:
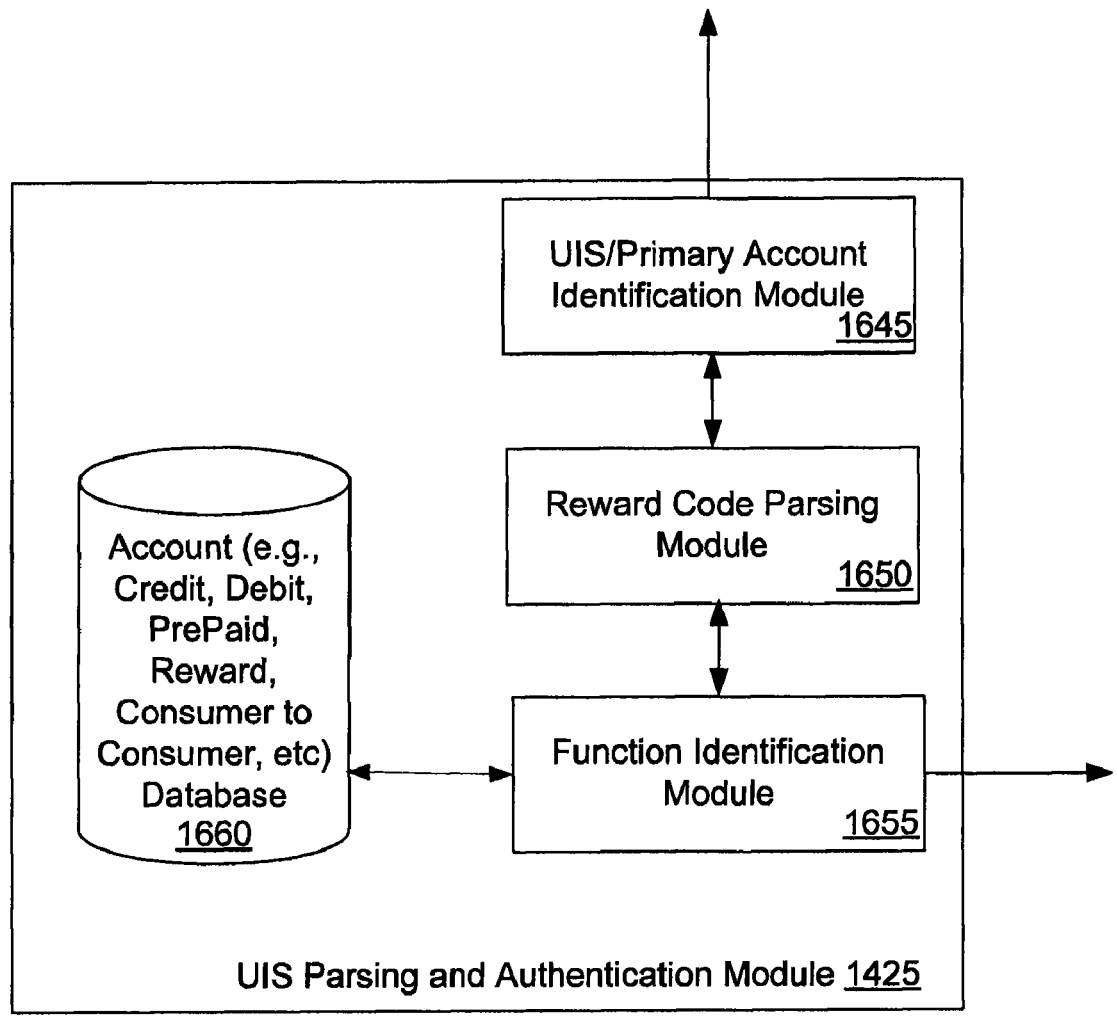
FIG. 16 is a block diagram illustrating various components that may be a part of a parsing and authentication module in accordance with some embodiments of the present invention.

FIG. 16 is a block diagram illustrating various components that may be a part of a UIS parsing and authentication module 1425 in accordance with some embodiments of the present invention. According to some embodiments, an incoming authorization or transaction request that includes a string of characters can be received from a POI device. Module 1425 can parse the string into the various tokens, verify whether a user is authorized to use the user operation vehicle, and determine whether an input string of characters contains a reward code. According to the embodiments shown in FIG. 16, UIS parsing and authentication module 1425 can include the following components: UIS/Primary account identification module 1645, reward code parsing module 1650, function identification module 1655, and account database 1660.

The transaction request, including the input string of characters, is received at UIS/Primary account identification module 1645. According to some embodiments of the present invention, the transaction request can include a payment request amount, primary account string, a user identification string (UIS), input string of characters, a function selector, a merchant identification code, a reward code, and/or other pieces of information. Module 1645 identifies the UIS and the primary account identification code in the transaction request. The identification of the UIS and primary account identification code can be done in many ways. For example, the transaction request can have a fixed structure (e.g., first sixteen characters are always the primary account identification code immediately followed by four characters which are the UIS entered by the user) allowing the parts to be easily identified. In some cases, the transaction request can include identification sub-strings which identify the organization, type of information, and/or the length of each of the sub-strings.

Reward code parsing module 1650 determines if any reward code is present in the input string of characters associated with the transaction request. The identification of the reward code can be done using many methods. For example, in some embodiments, the string of characters has a fixed structure (e.g., first eight characters are a reward code) allowing the parts to be easily identified. In some embodiments, the string of characters include identification sub-strings which identify the organization, type of information, and the length of each of the sub-strings. According to some embodiments, reward code parsing module 1650 can also identify customer and merchant information stored within the string of characters. This feature can be useful in embodiments where the same reward code can result in a different reward action for different merchants and/or customers.

Function identification module 1655, in some embodiments of the present invention, determines which payment function account associated with the user operation vehicle should be used if more than one account is available. This can be done in a variety of ways. For example, the UIS identified by UIS/Primary account identification module 1645 can be used to determine the payment function and account to be used in completing the authorization request. In some embodiments, a function selector can be provided by the user.

According to some embodiments, function identification module 1655 is in communication with account database 1660. Using the unique UIS, the function selector, or some other means of account identification, module 1655 is able to look up account information in database 1660 and verify that the user is authorized to request a transaction.

Figure 17:
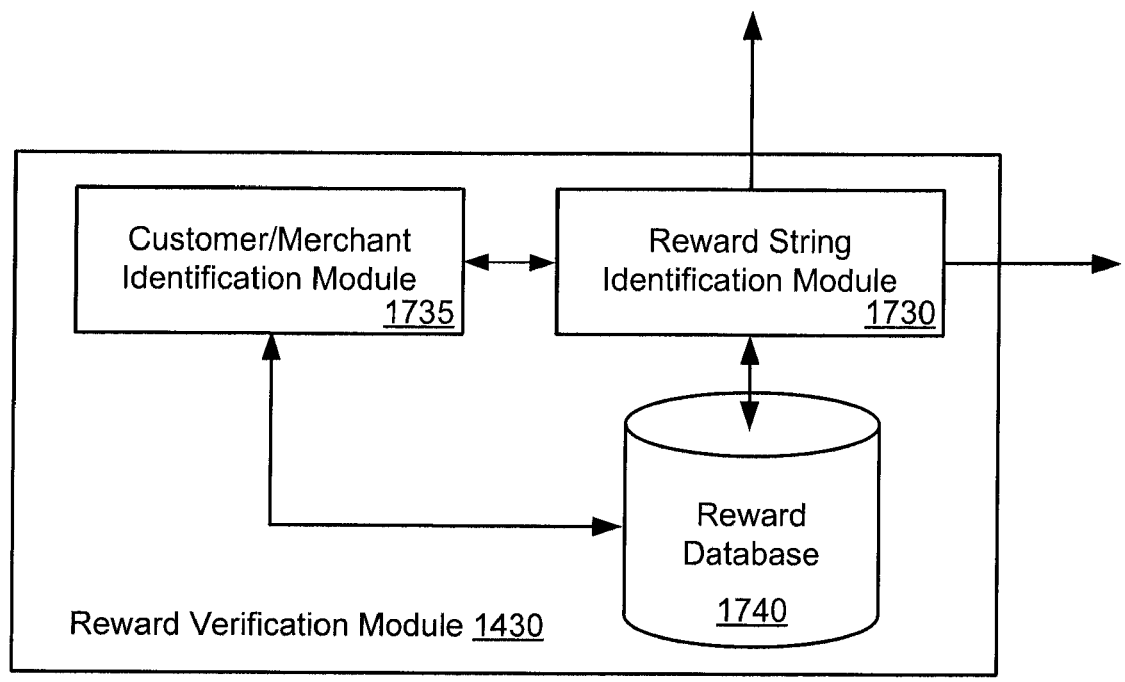
FIG. 17 is a block diagram illustrating various components that may be a part of a reward verification module in accordance with some embodiments of the present invention.

FIG. 17 is a block diagram illustrating various components that may be a part of reward verification module 1430 in accordance with some embodiments of the present invention. According to some embodiments of the present invention, if a determination is made that reward numbers exist in the input string, the reward numbers are passed to reward verification module 1430. Module 1430 uses the information provided by UIS parsing and authentication module 1425 to determine the reward and/or action associated with the reward numbers in the input string.

In some embodiments, reward verification module 1430 receives information about the transaction request. For example, reward verification module 1430 can receive the entire account string and/or various tokens from the string of characters (e.g., reward string, primary account, merchant code, etc.). Once the information is received, customer/merchant identification module 1735 and reward string identification module 1730 can be used to determine the appropriate reward action in accordance with various embodiments of the present invention.

Reward string identification module 1730 identifies the reward string or code from the information received. Then, according to some embodiments, determines if the reward string is customer and/or merchant specific. If so, then reward string identification module 1730 requests that customer/merchant identification module 1735 verify that the reward string is valid with the current customer and/or merchant. In accordance with some embodiments of the present invention, this type of information can be encoded in the reward code. In some embodiments, little (or no) information is encoded in the reward code and a lookup must be performed using reward database 1440 to determine the appropriate reward action and requirements.

For example, a particular reward code may provide for a twenty dollar discount on a purchase of seventy-five dollars or more only at Merchant A. Consequently, when reward string identification module 1730 determines that this code is only valid at Merchant A, a request can be made for merchant identification through customer/merchant identification module 1735. Once the request is received, then module 1735 determines whether the user is making the purchase specifically from Merchant A and returns the merchant identification to module 1730.

Figure 18:
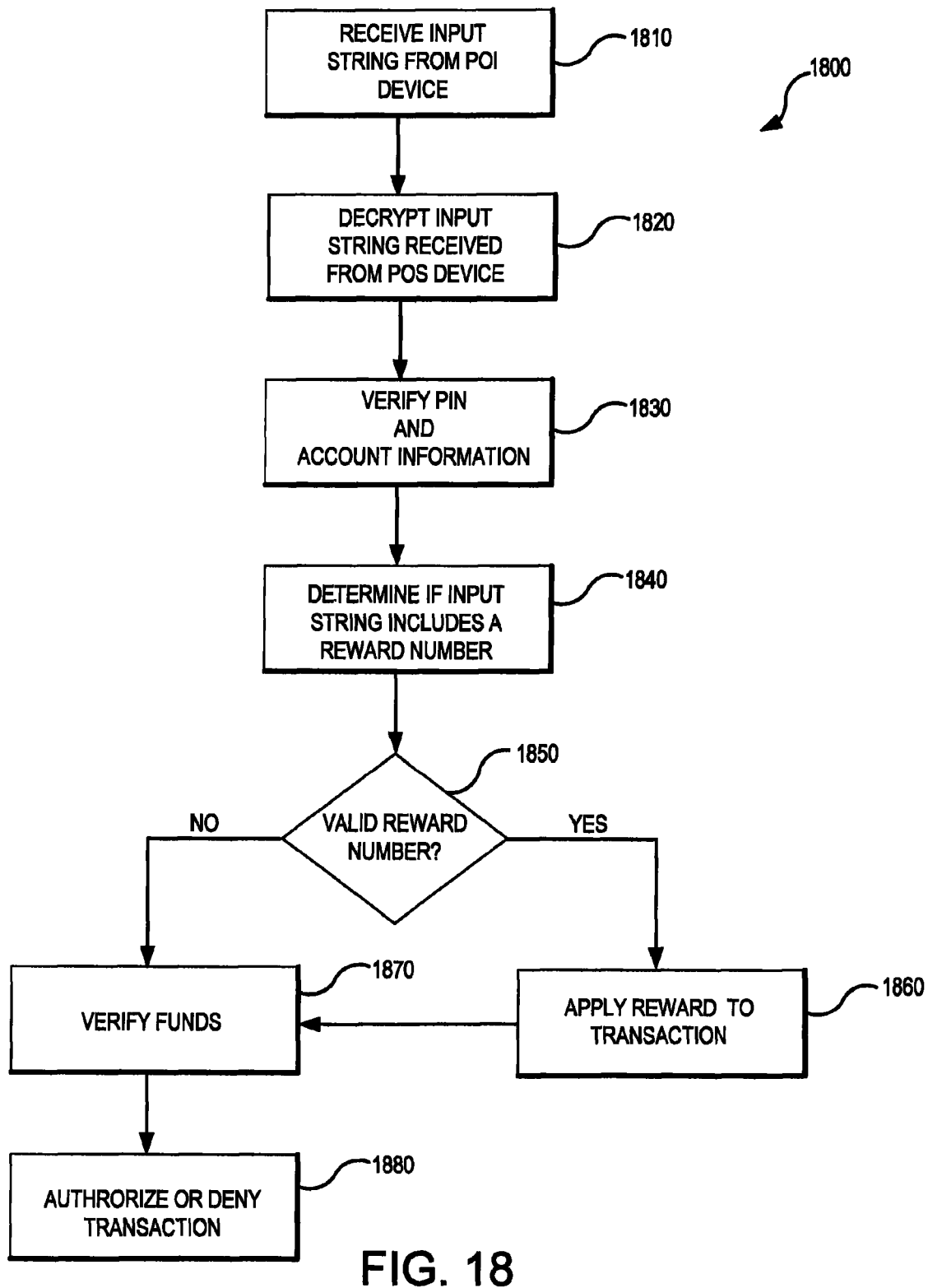
FIG. 18 is a flowchart illustrating operations for processing a transaction in accordance with some embodiments of the present invention.

FIG. 18 is a flowchart illustrating operations 1800 for processing a transaction from a POI device (e.g., a point of sale device) in accordance with some embodiments of the present invention. According to the embodiments of the present invention illustrated in FIG. 18, an input string is received from a POI device during receiving operation 1810. The input string may include one or more of a reward code, delayed payment option, a function selector, and/or a UIS. The POI device can be any mechanism, from a card reader to a personal computer, that can be used to facilitate the completion of a transaction with a merchant. According to some embodiments, once the input string is received it may or may not be encrypted before being transferred to the processing network. If the input string is encrypted, then a decryption can occur during decryption operation 1820 in accordance with some embodiments of the present invention before further processing of the input string.

During verification operation 1830, the UIS and account information are verified and a determination is made if the user is authorized to complete the transaction. For example, in some embodiments, a secure database is accessed which stores account identification information (e.g., account numbers) with one or more UIS's. The UIS included in the received input string is compared with the account identification information found in the input string. The secure database can also include, in some embodiments, routing and processing information for each account. If a decision is made that the user is not authorized, then the processing of the transaction ends.

Once verification operation 1830 is complete, determination operation 1840 determines if the received input string includes a reward number or code. If a reward code is present, then the code may be stored for later determination of the reward action. If a determination is made that no reward code is present, then no recording action is taken.

Once the account information and UIS are verified and a determination is made that the user is authorized, the processing operations branch to valid reward number decision operation 1850. According to some embodiments, valid reward number decision operation 1850 determines if the reward number in the input string is valid. If no reward number is present or a determination is made that the reward code is not valid, then the operations branch to funds verification operation 1870. If a determination is made that a valid reward number exists, then the reward action is determined and the processing operations branch to reward application operation 1860 where the reward action is applied. In some embodiments, decision operation 1850 determines if the reward number is valid by decoding the reward string, accessing a database and looking up part or all of the reward string, and/or using other methods.

Once the reward application operation 1860 finishes applying the reward action (e.g., five percent discount, ten dollars off, etc.), the transaction processing operations branch to funds verification operation 1870. Funds verification operation 1870 verifies the funds are available in the account (e.g., using a payment processing system). If the funds are available, then authorization operation 1880 completes the transaction between the POI device and the payment function. If sufficient funds are not available, or the transaction request is denied for any other reason (e.g., daily limit exceeded), then authorization operation 1880 terminates the transaction request and notifies the POI device that the transaction cannot be completed. In some embodiments, funds may be obtained from different accounts, according to a predetermined order, in order to complete the transaction. The transaction may be partially approved using only the funds available in the account in some embodiments. If the transaction is only partially approved, the user may be notified that additional funds are needed for the transaction to be completed.

Figure 19:
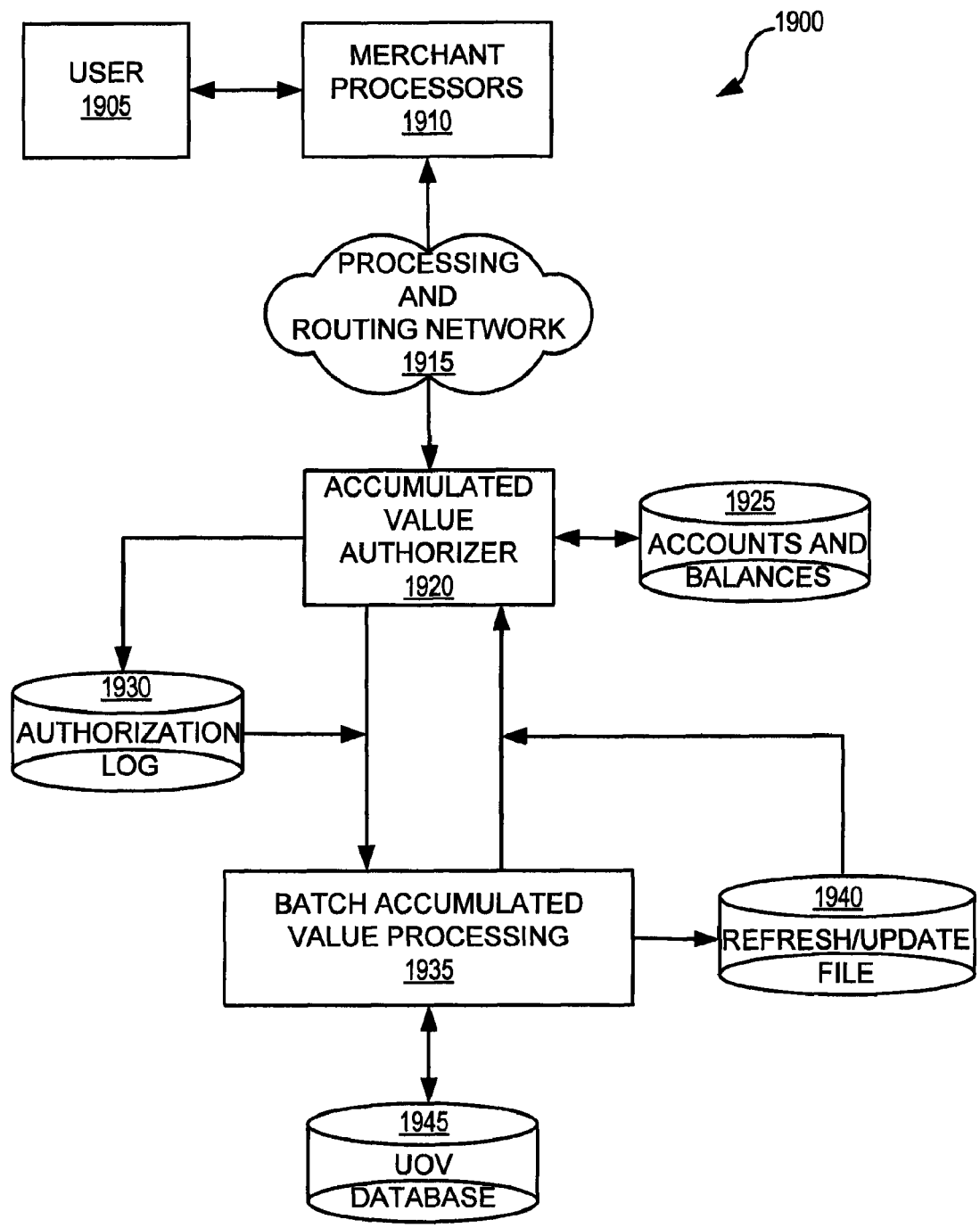
FIG. 19 is a block diagram illustrating various components that may be a part of an accumulated value function processing system in accordance with some embodiments of the present invention.

FIG. 19 is a block diagram illustrating various components that may be a part of an accumulated value function processing system (accumulated value function processor) 1900 in accordance with some embodiments of the present invention.

In accordance with the embodiments illustrated in FIG. 19, a user 1905 makes a purchase at a merchant using an accumulated value function associated with a user operation vehicle. Merchant processors 1910 (e.g., processors within a POI) generate an authorization request and transmit the authorization request to processing and routing network 1915. Processing and routing network 1915 can include, for example, network 1115, verification system 220, and processing systems 1130-1145.

A determination is made within the processing and routing network to route the authorization request to accumulated value authorizer 1920 for processing. Once the authorization request is received, accumulated value authorizer 1920 queries account and balances database 1925 to determine the available balance for the accumulated value function. The authorization request can also be logged in authorization log 1930 along with the action taken by accrued value authorizer 1920.

If the balance of the account is determined to have insufficient accrued value to cover the purchase, the accumulated value authorizer 1920 can deny the transaction, partially approve the transaction, or apply the balance and return a modified authorization request to the processing and routing network 1915 where another function associated with the user operation vehicle can be charged, or the balance can be returned to the processing and routing network 1915 where a decision is made on how to process the charge (e.g., submit part to the accumulated value function and part to another function).

If the accumulated value authorizer 1920 determines there is a sufficient balance (e.g., in rewards, cash equivalents, cash values, etc.) associated with the accumulated value function account, then the authorization request can be submitted to batch accumulated value processing module 1935. The batch accumulated value processing module 1935 updates or refreshes the account and balance file associated with the user once the processing occurs. The result (e.g., successful, failed, try again, etc.) can be communicated to the accrued value authorizer which communicates the result to the merchant processors 1910.

In addition to processing transaction using accumulated value functions, the accumulated value function processing system 1900 also credits accrued value to the accumulated value function account. For example, when user 1905 makes a purchase from a particular merchant and/or for an item within a particular category (e.g., food, gas, automotive, etc.) an accrued value can be generated. The purchase information (e.g., amount, identification, etc.) is transmitted to the accumulated value authorizer 1920. The accumulated value authorizer 1920 makes a determination using accumulation logic of the amount that the accumulated value account should be credited. This information is passed to the batch accumulated value processing module 1935 where the user operation vehicle information is verified using the user operation vehicle database 1945 and the accrued value amount is updated.

In some embodiments, the user can access account history, the reconciliation process, the settlement process, statements, and other information through a remote interface in communication with the accumulated value function processing system 1900. Examples of a remote interface include, but are not limited to a webpage, Java™ application, a downloadable computer program, cell phone applet, dedicated terminal, and/or the like.

Figure 20:
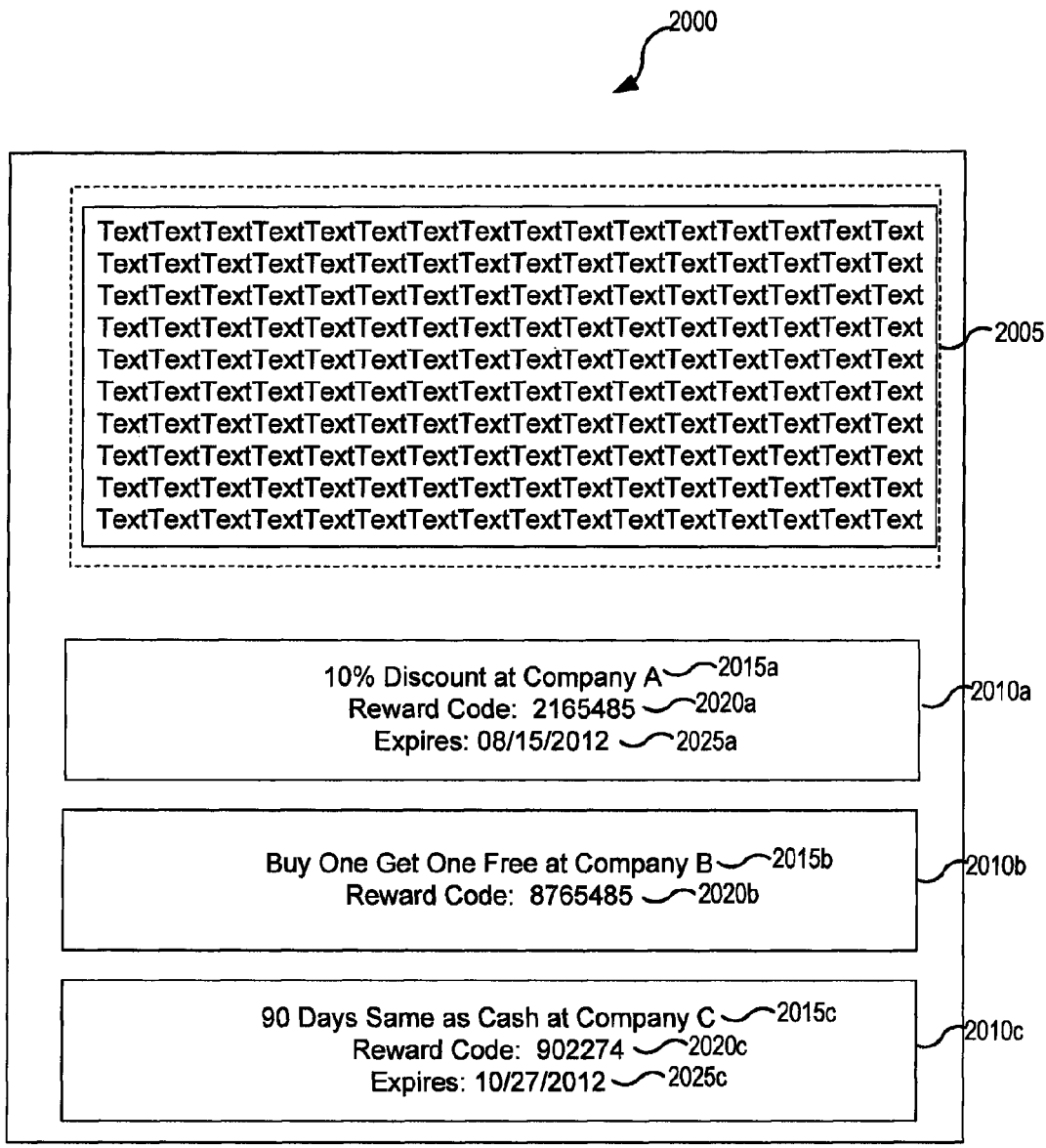
FIG. 20 is an example of a promotional flyer that may be used in some embodiments of the present invention.

FIG. 20 is an example of a promotional flyer 2000 that includes reward codes that may be used in some embodiments of the present invention. While FIG. 20 illustrates a promotional flyer 2000 that includes reward codes, the reward codes can come from any number of places. For example, according to some embodiments, reward codes can be found on food packaging (e.g., under a bottle cap, the back of a box, etc.), television advertisements, promotional flyers, coupon book, newspaper advertisements, automated telephone calls (e.g., from outbound voice response units), promotional emails, short messaging system (SMS) message, and/or the like. In some embodiments, the promotional flyers can be created with paper, plastic, or other material. The promotional codes can take any form from solely numerical strings to alphanumeric strings.

FIG. 20 shows a communication region 2005 where text, graphics, drawings, pictures, and/or the like can be used to convey information about the promotion to the viewer. In the embodiments shown in FIG. 20, below communication region 2005 are three reward regions 2010*a*-2010*c*. However, in other embodiments, the place of the reward regions and the number of coupons can vary.

Within each reward region is a description of the type of reward (2015*a*-2015*c*). However, in other embodiments, no description may be present and the reward may remain unknown to the user until the user enters the reward code during a transaction. In addition to a description, the reward regions include at least one reward code (2020*a*-2020*c*) and possibly an expiration date (2025*a* and 2025*c*) after which the reward codes will no longer be valid. In the embodiments shown, the reward codes are completely numerical. However, according to some embodiments, the reward codes can be of any length and can, in some cases, include letters.

In some embodiments, the reward codes may be presented to users through the POI device or a screen attached to the POI or POI system. According to some embodiments, the POI can download various advertisements during the day (e.g., at night, periodically throughout the day, once a day, on a predetermined schedule, etc.). Associated with each advertisement is an advertising code. The system will send advertising codes to the POI that will trigger these advertising components to be shown on the POI device itself or a device in communication with the system. One advantage of downloading the advertisements and allowing the system to send advertising codes to trigger the advertisements is the ability to display the advertisements quicker since they have been previously downloaded.

Exemplary Computer System Overview

Some embodiments of the present invention include various steps, some of which may be performed by hardware components or may be embodied in machine-executable instructions. These machine-executable instructions may be used to cause a general-purpose or special-purpose processor programmed with the instructions to perform the steps. Alternatively, the steps may be performed by a combination of hardware, software, and/or firmware. In addition, some embodiments of the present invention may be performed or implemented, at least in part (e.g., one or more modules), on one or more computer systems, mainframes (e.g., IBM mainframes such as the IMB zSeries, Unisys ClearPath Mainframes, HP Integrity NonStop servers, NEC Express series, and others), or client-server type systems. In addition, specific hardware aspects of embodiments of the present invention may incorporate one or more of these system, or portions thereof.

Figure 21:
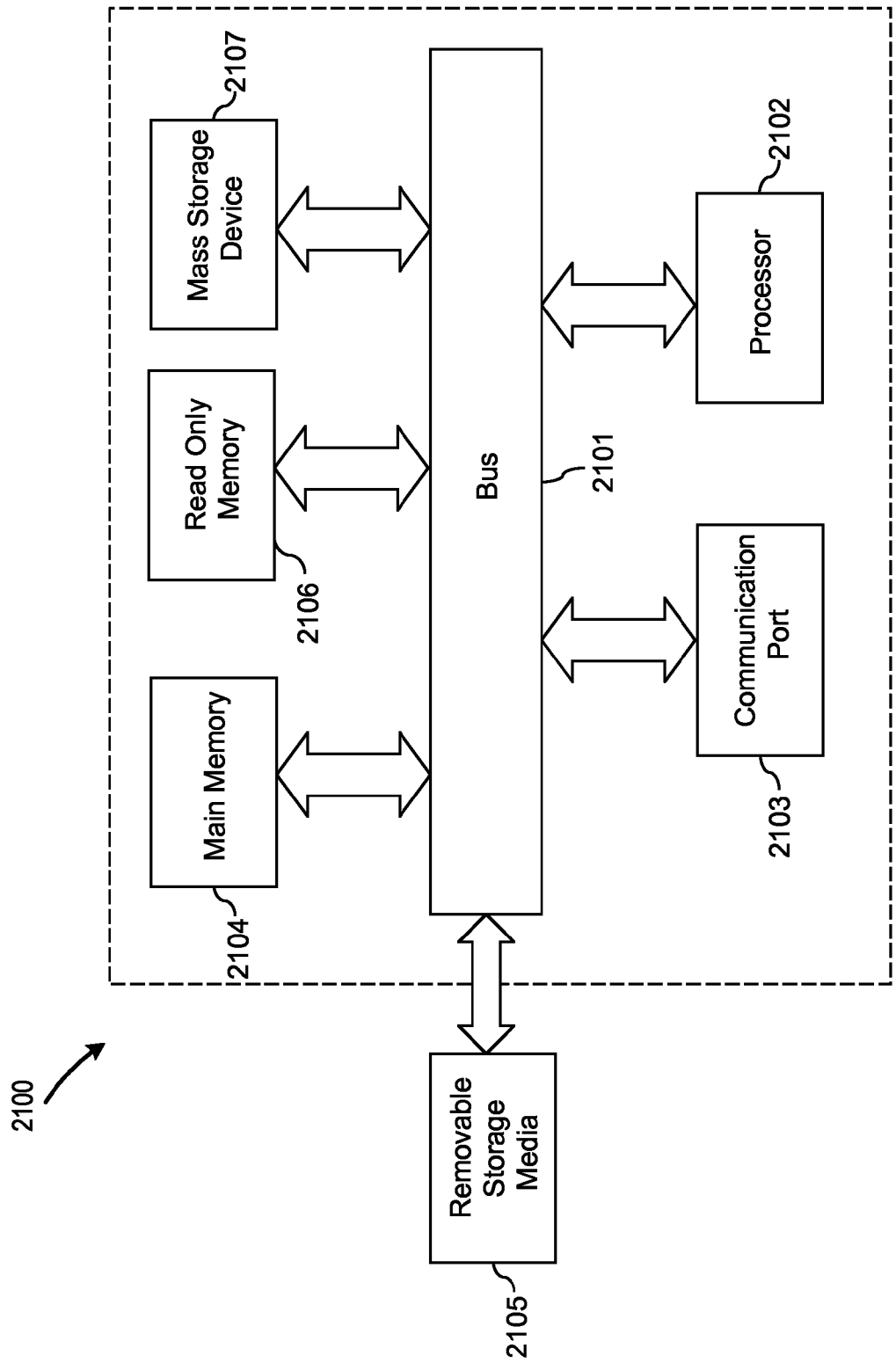
FIG. 21 illustrates an example of a computer system with which some embodiments of the present invention may be utilized.

As such, FIG. 21 is an example of a computer system 2100 with which embodiments of the present invention may be utilized. According to the present example, the computer system includes a bus 2101, at least one processor 2102, at least one communication port 2103, a main memory 2104, a removable storage media 2105, a read only memory 2106, and a mass storage 2107. In some embodiments, an encryption/decryption hardware component (not shown) may be present or associated with the computer system 2100. Examples of commercially available components are currently available from ATALLA, THALES, and IBM. In some embodiments one or more nCipher host security modules can be used.

Processor(s) 2102 can be any known processor, such as, but not limited to, an Intel® Itanium® or Itanium 2® processor(s), or AMD® Opteron® or Athlon MP® processor(s), or Motorola® lines of processors. Communication port(s) 2103 can be any of an RS-232 port for use with a modem based dialup connection, a 10/100 Ethernet port, or a Gigabit port using copper or fiber. Communication port(s) 2103 may be chosen depending on a network such a Local Area Network (LAN), Wide Area Network (WAN), or any network to which the computer system 2100 connects.

Main memory 2104 can be Random Access Memory (RAM), or any other dynamic storage device(s) commonly known in the art. Read only memory 2106 can be any static storage device(s) such as Programmable Read Only Memory (PROM) chips for storing static information such as instructions for processor 2102.

Mass storage 2107 can be used to store information and instructions. For example, hard disks such as the Adaptec® family of SCSI drives, an optical disc, an array of disks such as RAID, such as the Adaptec® family of RAID drives, or any other mass storage devices may be used.

Bus 2101 communicatively couples processor(s) 2102 with the other memory, storage and communication blocks. Bus 2101 can be a PCI/PCI-X or SCSI based system bus depending on the storage devices used.

Removable storage media 2105 can be any kind of external hard-drives, floppy drives, flash drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

In conclusion, embodiments of the present invention provide novel systems, methods and arrangements for the generation of user identification strings used with multi-function operation vehicles and to the addition of functionality to a user identification string for use at a POI. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for activating a user operation vehicle comprising:
  an activation portal to facilitate activation of the user operation vehicle by requesting a base user identification string (UIS) and a vehicle code identifying a user operation vehicle, wherein the activation portal is associated with 1) an encryptor to generate an encrypted base UIS and 2) a communications module to communicate the encrypted base UIS and the vehicle code over a communication network;
  a verifier in communication with the activation portal through the communication network, wherein the verification system receives the encrypted base UIS and the vehicle code from the activation portal through the communication network, authenticates the vehicle code, and identifies accounts that are linked to the user operation vehicle; and
  a UIS generator in communication with the activation portal and verification system through the communications network, wherein the UIS generator includes a decryptor and a UIS generation module to generate a unique account-specific UIS from the encrypted base UIS for each account linked to the user operation vehicle by modifying the base UIS, wherein the UIS generator modifies the base UIS to generate the unique account-specific UIS for each account linked to the user operation vehicle by appending a string of one or more additional characters to the base UIS for each account linked.

2. The system of claim 1, further comprising a linkage generator to link one or more accounts to the user operation vehicle.

3. The system of claim 1, wherein the accounts that are linked to the user operation vehicle include two or more of a debit account, a credit account, a consumer to consumer account, a prepaid account, and an accumulated value account.

4. The system of claim 1, wherein the vehicle code includes a primary account number associated with the user operation vehicle.

5. The system of claim 1, wherein the string of one or more additional characters appended to the base UIS include a different single number for each account linked to the user operation vehicle.

6. The system of claim 5, wherein the string of one or more additional characters include the number one for a first debit account, the number two for a first credit account, and the number three for a first accumulated value account.

7. The system of claim 1, further comprising:
  a linkage generator to link accounts to the user operation vehicle; and
  an account entry and verification module to generate a user interface screen on the activation portal to receive information from the user regarding one or more user entered accounts, verify the information using the verifier, and link the one or more user entered accounts to the user operation vehicle using the linkage generator.

8. The system of claim 1, further comprising a user interface screen generation module to:
  display a first user interface screen on a terminal in response to a request to activate the user operation vehicle received through the activation portal, the first user interface screen capable of receiving information regarding accounts to be linked to the user operation vehicle, and wherein the first user interface screen is further capable of sending a linking request to a linkage generator to link the accounts;
  display a second user interface screen on the terminal in response to the linking request, wherein the second user interface screen displays a linking status for each of the accounts received on the first user interface screen;
  display a third user interface screen on the terminal that presents a request for the user to enter the base UIS to be associated with the user operation vehicle, wherein upon entry of the base UIS, the base UIS is transmitted to the UIS generator to generate the account-specific UIS for each successfully linked account; and
  display a fourth user interface screen on the terminal in response to a communication from the UIS generator, wherein the fourth user interface screen displays the account-specific UIS for each of the one or more accounts successfully linked.

9. The system of claim 8, wherein the fourth user interface screen includes a graphical user interface that allows the user to reassociate the account-specific UIS generated for one account with another account.

10. The system of claim 8, wherein the third user interface screen includes 1) a computer application that presents the request for the user to enter the base UIS and 2) a base UIS generator link that will select a base UIS from information about the user stored in one or more fields.

11. The system of claim 10, further comprising a random field selection module to select randomly a selected field from the one or more fields.

12. The system of claim 10, wherein the information about the user stored in the one or more fields include a social security number, a zip code, a telephone number, and a number from a street address.

13. The system of claim 1, wherein the encryptor and the decryptor include only hardware components.

14. The system of claim 1, wherein the encryptor and the decryptor include one or more nCipher host security modules.

15. The system of claim 1, wherein the encryptor and the decryptor use one or more of triple DES encryption, secure sockets layer (SSL) encryption, transport layer security (TLS) encryption, and public/private key encryption.

16. The system of claim 1, wherein the communication network is an Internet.

17. The system of claim 1, further comprising:
  a point of interaction to receive a user entered account-specific UIS and generate a transaction request that includes the user entered account-specific UIS;
  the verifier to receive the transaction request and identify an account type associated with the user entered account-specific UIS;
  a switch to route the transaction request through a payment processing system associated with the account type identified by the verifier.

18. The system of claim 17, wherein the user entered account-specific UIS includes a common portion and an account-specific portion that identifies the account type.

19. The system of claim 18, wherein the common portion is the base UIS.

20. A system for activating a user operation vehicle comprising:
  an activation portal to facilitate activation of the user operation vehicle by requesting a base user identification string (UIS) and a vehicle code identifying a user operation vehicle, wherein the activation portal is associated with 1) an encryptor to generate an encrypted base UIS and 2) a communications module to communicate the encrypted base UIS and the vehicle code over a communication network;

a verifier in communication with the activation portal through the communication network, wherein the verification system receives the encrypted base UIS and the vehicle code from the activation portal through the communication network, authenticates the vehicle code, and identifies accounts that are linked to the user operation vehicle; and a UIS generator in communication with the activation portal and verification system through the communications network, wherein the UIS generator includes a decryptor and a UIS generation module to generate a unique account-specific UIS from the encrypted base UIS for each account linked to the user operation vehicle by modifying the base UIS;

a user interface screen generation module to:
  display a first user interface screen on a terminal in response to a request to activate the user operation vehicle received through the activation portal, the first user interface screen capable of receiving information regarding accounts to be linked to the user operation vehicle, and wherein the first user interface screen is further capable of sending a linking request to a linkage generator to link the accounts;
  display a second user interface screen on the terminal in response to the linking request, wherein the second user interface screen displays a linking status for each of the accounts received on the first user interface screen;
  display a third user interface screen on the terminal that presents a request for the user to enter the base UIS to be associated with the user operation vehicle, wherein upon entry of the base UIS, the base UIS is transmitted to the UIS generator to generate the account-specific UIS for each successfully linked account; and
  display a fourth user interface screen on the terminal in response to a communication from the UIS generator, wherein the fourth user interface screen displays the account-specific UIS for each of the one or more accounts successfully linked,
  wherein the third user interface screen includes 1) a computer application that presents the request for the user to enter the base UIS and 2) a base UIS generator link that will select a base UIS from information about the user stored in one or more fields;
a random field selection module to select randomly a selected field from the one or more fields; and
a random field portion generator to select a portion of the information stored in the selected field.

21. The system of claim 20, wherein the portion of the information selected by the random field portion generator is the first four numbers or the last four numbers of the information stored in the selected field.

22. A system for activating a operation vehicle comprising:
an activation portal to facilitate activation of the user operation vehicle by requesting a base user identification string (UIS) and a vehicle code identifying a user operation vehicle, wherein the activation portal is associated with 1) an encryptor to generate an encrypted base UIS and 2) a communications module to communicate the encrypted base UIS and the vehicle code over a communication network;
a verifier in communication with the activation portal through the communication network, wherein the verification system receives the encrypted base UIS and the vehicle code from the activation portal through the communication network, authenticates the vehicle code, and identifies accounts that are linked to the user operation vehicle;
a UIS generator in communication with the activation portal and verification system through the communications network, wherein the UIS generator includes a decryptor and a UIS generation module to generate a unique account-specific UIS from the encrypted base UIS for each account linked to the user operation vehicle by modifying the base UIS;
a point of interaction to receive a user entered account-specific UIS and generate a transaction request that includes the user entered account-specific UIS;
the verifier to receive the transaction request and identify an account type associated with the user entered account-specific UIS; and
a switch to route the transaction request through a payment processing system associated with the account type identified by the verifier,
wherein the user entered account-specific UIS includes a common portion and an account-specific portion that identifies the account type; and
wherein user entered account-specific UIS is a five digit number with the last digit identifying the account type.

23. A system for generating account-specific user identification strings (UIS), the system comprising:
a communication device in communication with an activation portal used to activate a user operation vehicle;
a processor in communication with the communication device and a memory;
a linkage determiner and a decryptor operable with the memory to cause the processor, after a base UIS that is encrypted is received by the communication device, to decrypt the base UIS and determine a list of accounts linked to the user operation vehicle; and
wherein the processor also generates a unique account-specific UIS for each account linked to the user operation vehicle by modifying the base UIS.

24. The system of claim 23, wherein to generate the unique account-specific UIS for each account linked to the user operation vehicle by modifying the base UIS the processor causes one or more additional characters to be appended to the base UIS for each account linked to the user operation vehicle.

25. The system of claim 24, wherein the one or more additional characters are numbers.

26. The system of claim 23, wherein the processor determines a function type for each account linked to the user operation vehicle, associate a number with each account in the determined function types, and generate the unique account-specific UIS by adding a function offset associated with the account type, the number associated with the account, and the base UIS.

27. The system of claim 23, wherein the processor also:
encrypts each account-specific UIS generated;
communicates each encrypted account-specific UIS to a payment network that includes a UIS database; and
stores the account-specific UIS for each account linked to the user operation vehicle in the UIS database.

28. The system of claim 23, further comprising:
a verification module to verify user operation vehicle identification information; and
wherein the processor also:
  displays an identification user interface screen through the activation portal, wherein the identification user interface screen is operable to receive the user operation vehicle identification information; and verifies the user operation vehicle identification information entered through the identification user interface screen by transmitting the user operation vehicle identification information to the verification module.

29. A computer-implemented method comprising:
receiving, at a user identification string (UIS) generator, an encrypted base UIS from an activation portal;
using a decryptor to determine a base UIS by decrypting the encrypted base UIS received from the activation portal;
determining a list of accounts linked to a user operation vehicle; and
generating an account-specific UIS for each account linked to the user operation vehicle by modifying the base UIS, wherein modifying the base UIS includes appending one or more additional numbers to the base UIS for each account linked to the user operation vehicle.

30. The computer-implemented method of claim 29, wherein the one or more additional numbers appended to the first UIS include the number one for a first debit account, the number two for a first credit account, and the number three for a first accumulated value account.

31. The computer-implemented method of claim 30, further comprising:
receiving a user entered account-specific UIS as part of an authorization request from a point of interaction device;
identifying the account associated with the user entered account-specific UIS; and
routing the transaction request through a function processor associated with the account.

32. The computer-implemented method of claim 31, wherein the user entered account-specific UIS is a five digit number, where the last digit identifies the account.

33. The computer-implemented method of claim 29, further comprising:
encrypting, using an encryptor, each account-specific UIS generated;
communicating each encrypted account-specific UIS to a UIS verifier that includes a UIS database;
decrypting each encrypted account-specific UIS communicated to the UIS verifier; and
storing the account-specific UIS for each account linked to the user operation vehicle in the UIS database.

34. The computer-implemented method of claim 33, wherein encrypting each account-specific UIS generated is done using one or more of triple DES encryption, secure sockets layer (SSL) encryption, transport layer security (TLS) encryption, and public/private key encryption.

35. The computer-implemented method of claim 29, further comprising
displaying a graphical user interface on a terminal that allows a user to access the activation portal;
receiving the base UIS from a user through the graphical user interface;
encrypting the base UIS to generate the encrypted base UIS; and
transferring the encrypted base UIS to the UIS generation system.

36. The computer-implemented method of claim 35, wherein the base UIS received through the graphical user interface is a four digit number.

37. The computer-implemented method of claim 29, further comprising generating reward UIS screen for display on a terminal, wherein the reward UIS screen allows entry of one or more reward UIS's that will be associated with one or more rewards at a future time.

38. The computer-implemented method of claim 29, further comprising generating a reward UIS that can be used for a reward.

39. The computer-implemented method of claim 38, further comprising sending an email or short message service (SMS) message to a user advising the user that entering the reward UIS at a point of interaction (POI) will result in the reward being applied.

40. The computer-implemented method of claim 38, wherein the reward is a one-time percentage discount or a one-time bonus.

41. The computer-implemented method of claim 40, wherein the reward is granted after a predetermined number of uses of the user operation vehicle with the reward UIS.

42. The computer-implemented method of claim 29, further comprising generating a completion screen for display on a terminal, wherein the completion screen provides an indication to a user that the generation of the account-specific UIS for each account linked to the user operation vehicle is complete and a list of the account-specific UIS generated for each account.

43. The computer-implemented method of claim 42, wherein the completion screen includes a graphical user interface that allows the user to reassociate the account-specific UIS generated for one account with another account.

44. The computer-implemented method of claim 29, further comprising:
displaying an identification user interface screen to receive user operation vehicle identification information; and
verifying the user operation vehicle identification information by transmitting to an vehicle information verifier the user operation vehicle identification information received through the identification user interface screen.

45. The computer-implemented method of claim 29, wherein determining a list of accounts linked to the user operation vehicle comprises:
displaying an account user interface screen to receive information about one or more accounts to be associated with the user operation vehicle;
receiving, at the account user interface screen, a list of accounts to be associated with the user operation vehicle; and
transferring the list of accounts to a UIS generator.

46. The computer-implemented method of claim 29, wherein determining a list of accounts linked to the user operation vehicle comprises:
receiving user operation vehicle identification information; and
searching an account database for accounts that can be linked with the received user operation vehicle identification information.

47. The computer-implemented method of claim 46, further comprising:
displaying an account user interface screen that includes a list of the accounts found in the account database that can be linked with the user operation vehicle;
receiving a selection input from a user selecting some or all of the accounts on the list to generate a selected set of accounts; and
transferring the selected set of accounts to a UIS generator.

48. The computer-implemented method of claim 29, wherein the list of accounts linked to the user operation vehicle includes two or more of a credit account, a debit account, a prepaid account, a consumer to consumer account, or a reward account.

49. A computer-readable storage medium containing a set of instructions capable of causing one or more processors to:
- receive a base user identification string (UIS) to be associated with one or more accounts linked to a user operation vehicle; and
- generate a unique account-specific UIS for each of the one or more accounts linked to the user operation vehicle modifying the base UIS,
- wherein the set of instructions modify the base UIS by appending one or more additional characters to the base UIS for each of the one or more accounts.

50. The computer-readable storage medium of claim 49, wherein the set of instructions are further capable of causing one or more processors to:
- monitor for a set base UIS request or a change base UIS request;
- generate a UIS portal after the set base UIS request or the change base UIS request has been detected, wherein the UIS portal allows a user to enter a new base UIS;
- generate an encrypted base UIS by encrypting the base UIS entered by the user; and
- transfer the encrypted base UIS to a UIS generator.

51. The computer-readable storage medium of claim 50, wherein the UIS portal is a webpage.

52. An apparatus for activating a user operation vehicle, the apparatus comprising:
- a means for receiving a base user identification string (UIS) to be associated with one or more accounts linked to the user operation vehicle; and
- a means for generating a unique account-specific UIS for each of the one or more accounts linked to the user operation vehicle modifying the base UIS,
- wherein the means to generate a unique account-specific UIS modifies the base UIS by appending one or more additional characters to the base UIS for each of the one or more accounts.

53. An apparatus for activating a user operation vehicle, the apparatus comprising:
- a means for receiving a base user identification string (UIS) to be associated with one or more accounts linked to the user operation vehicle;
- a means for generating a unique account-specific UIS for each of the one or more accounts linked to the user operation vehicle modifying the base UIS;
- a monitoring means for monitoring for a set base UIS request or a change base UIS request;
- a generation means for generating a UIS portal after the set base UIS request or the change base UIS request has been detected, wherein the UIS portal allows a user to enter a new base UIS; and
- an encryptor to generate an encrypted base UIS by encrypting the base UIS entered by the user.

54. The apparatus of claim 53, wherein the UIS portal includes a computer application that allows the user to enter the new base UIS.

55. The apparatus of claim 53, wherein the UIS portal includes a link to select a base UIS from user information stored in or more fields.

56. The apparatus of claim 55, wherein the user information stored in the one or more fields include a social security number, a zip code, a telephone number, and a street address.

57. The apparatus of claim 55, further comprising a field selection means for randomly selecting a field of information from the one or more fields.

58. The apparatus of claim 57, further comprising a portion selection means for selecting a portion of the information stored in the field selected by the field selection means.

59. The apparatus of claim 58, wherein the portion of the information selected by the portion selection means is the first four numbers or the last four numbers of the information stored in the selected field.

* * * * *

UNITED STATES PATENT AND TRADEMARK OFFICE
CERTIFICATE OF CORRECTION

| | | |
|---|---|---|
| PATENT NO. | : 8,162,208 B2 | Page 1 of 1 |
| APPLICATION NO. | : 12/395614 | |
| DATED | : April 24, 2012 | |
| INVENTOR(S) | : Daniel J. Eckert et al. | |

It is certified that error appears in the above-identified patent and that said Letters Patent is hereby corrected as shown below:

Column 41, line 55, Claim 22 is missing the word "user" after the words "activating a" and before the words "operation vehicle"

Signed and Sealed this
Fifth Day of June, 2012

David J. Kappos
*Director of the United States Patent and Trademark Office*